(12) United States Patent
Chui et al.

(10) Patent No.: US 7,889,163 B2
(45) Date of Patent: Feb. 15, 2011

(54) DRIVE METHOD FOR MEMS DEVICES

(75) Inventors: Clarence Chui, San Mateo, CA (US); Manish Kothari, Cupertino, CA (US); Marc Mignard, San Jose, CA (US); Mithran C. Mathew, Mountain View, CA (US); Jeffrey B. Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 739 days.

(21) Appl. No.: 11/118,612

(22) Filed: Apr. 29, 2005

(65) Prior Publication Data

US 2006/0044928 A1 Mar. 2, 2006

Related U.S. Application Data

(63) Continuation-in-part of application No. 11/027,693, filed on Dec. 30, 2004, now abandoned, which is a continuation-in-part of application No. 11/026,555, filed on Dec. 30, 2004, now abandoned, application No. 11/118,612, filed on Apr. 29, 2005.

(60) Provisional application No. 60/646,053, filed on Jan. 21, 2005, provisional application No. 60/604,892, filed on Aug. 27, 2004, provisional application No. 60/614,032, filed on Sep. 27, 2004, provisional application No. 60/604,893, filed on Aug. 27, 2004.

(51) Int. Cl.
*G09G 3/34* (2006.01)
(52) U.S. Cl. .............. 345/85; 345/84; 345/55; 345/204; 359/237; 359/242; 359/243; 359/245
(58) Field of Classification Search ......... 359/237–275; 345/84–107, 204, 55
See application file for complete search history.

(56) References Cited

U.S. PATENT DOCUMENTS 3,982,239 A 9/1976 Sherr (Continued)

FOREIGN PATENT DOCUMENTS

EP 0295802 A 12/1988

(Continued)

OTHER PUBLICATIONS

Miles, MEMS-based interferometric modulator for display applications, Part of the SPIE Conference on Micromachined Devices and Components, vol. 3876, pp. 20-28 (1999).

(Continued)

*Primary Examiner*—Alexander Eisen
*Assistant Examiner*—Jason M Mandeville
(74) *Attorney, Agent, or Firm*—Knobbe Martens Olson & Bear

(57) ABSTRACT

Embodiments of exemplary MEMS interferometric modulators are arranged at intersections of rows and columns of electrodes. In certain embodiments, the column electrode has a lower electrical resistance than the row electrode. A driving circuit applies a potential difference of a first polarity across electrodes during a first phase and then quickly transition to applying a bias voltage having a polarity opposite to the first polarity during a second phase. In certain embodiments, an absolute value of the difference between the voltages applied to the row electrode is less than an absolute value of the difference between the voltages applied to the column electrode during the first and second phases.

44 Claims, 14 Drawing Sheets

U.S. PATENT DOCUMENTS

| | | | |
|---|---|---|---|
| 4,082,430 A * | 4/1978 | Schulthess et al. ............ 345/87 |
| 4,403,248 A | 9/1983 | te Velde |
| 4,441,791 A | 4/1984 | Hornbeck |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,566,935 A | 1/1986 | Hornbeck |
| 4,571,603 A | 2/1986 | Hornbeck et al. |
| 4,596,992 A | 6/1986 | Hornbeck |
| 4,608,558 A * | 8/1986 | Amstutz et al. ............ 345/94 |
| 4,615,595 A | 10/1986 | Hornbeck |
| 4,662,746 A | 5/1987 | Hornbeck |
| 4,681,403 A | 7/1987 | te Velde et al. |
| 4,709,995 A | 12/1987 | Kuribayashi et al. |
| 4,710,732 A | 12/1987 | Hornbeck |
| 4,815,035 A * | 3/1989 | Brooks ............ 365/108 |
| 4,856,863 A | 8/1989 | Sampsell et al. |
| 4,859,060 A | 8/1989 | Katagiri et al. |
| 4,954,789 A | 9/1990 | Sampsell |
| 4,956,619 A | 9/1990 | Hornbeck |
| 4,982,184 A | 1/1991 | Kirkwood |
| 5,013,137 A * | 5/1991 | Tsuboyama et al. ........ 349/191 |
| 5,018,256 A | 5/1991 | Hornbeck |
| 5,028,939 A | 7/1991 | Hornbeck et al. |
| 5,037,173 A | 8/1991 | Sampsell et al. |
| 5,055,833 A | 10/1991 | Hehlen et al. |
| 5,061,049 A | 10/1991 | Hornbeck |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,142,414 A | 8/1992 | Koehler |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,227,900 A | 7/1993 | Inaba et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,296,950 A | 3/1994 | Lin et al. |
| 5,305,640 A | 4/1994 | Boysel et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,461,411 A | 10/1995 | Florence et al. |
| 5,481,274 A | 1/1996 | Aratani et al. |
| 5,483,260 A | 1/1996 | Parks et al. |
| 5,488,505 A | 1/1996 | Engle |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,550,373 A | 8/1996 | Cole et al. |
| 5,551,293 A | 9/1996 | Boysel et al. |
| 5,552,924 A | 9/1996 | Tregilgas |
| 5,552,925 A | 9/1996 | Worley |
| 5,563,398 A | 10/1996 | Sampsell |
| 5,567,334 A | 10/1996 | Baker et al. |
| 5,570,135 A | 10/1996 | Gove et al. |
| 5,578,976 A | 11/1996 | Yao |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,598,565 A | 1/1997 | Reinhardt |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,612,713 A | 3/1997 | Bhuva et al. |
| 5,613,103 A | 3/1997 | Nobutani et al. |
| 5,619,061 A | 4/1997 | Goldsmith et al. |
| 5,619,365 A | 4/1997 | Rhoades et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,636,052 A | 6/1997 | Arney et al. |
| 5,638,084 A | 6/1997 | Kalt |
| 5,638,946 A | 6/1997 | Zavracky |
| 5,646,768 A | 7/1997 | Kaeiyama |
| 5,650,834 A | 7/1997 | Nakagawa et al. |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,717,421 A * | 2/1998 | Katakura et al. ............ 345/101 |
| 5,745,193 A | 4/1998 | Urbanus et al. |
| 5,745,281 A | 4/1998 | Yi et al. |
| 5,754,160 A | 5/1998 | Shimizu et al. |
| 5,771,116 A | 6/1998 | Miller et al. |
| 5,784,189 A | 7/1998 | Bozler et al. |
| 5,784,212 A | 7/1998 | Hornbeck |
| 5,808,780 A | 9/1998 | McDonald |
| 5,818,095 A | 10/1998 | Sampsell |
| 5,827,215 A | 10/1998 | Yoon |
| 5,835,255 A | 11/1998 | Miles |
| 5,842,088 A | 11/1998 | Thompson |
| 5,867,302 A | 2/1999 | Fleming et al. |

| | | | | | | |
|---|---|---|---|---|---|---|
| 5,912,758 | A | 6/1999 | Knipe et al. | 6,787,438 | B1 | 9/2004 | Nelson |
| 5,943,158 | A | 8/1999 | Ford et al. | 6,788,520 | B1 | 9/2004 | Behin et al. |
| 5,959,763 | A | 9/1999 | Bozler et al. | 6,794,119 | B2 | 9/2004 | Miles |
| 5,966,235 | A | 10/1999 | Walker et al. | 6,811,267 | B1 | 11/2004 | Allen et al. |
| 5,986,796 | A | 11/1999 | Miles | 6,813,060 | B1 | 11/2004 | Garcia et al. |
| 6,028,690 | A | 2/2000 | Carter et al. | 6,819,469 | B1 | 11/2004 | Koba |
| 6,038,056 | A | 3/2000 | Florence et al. | 6,822,628 | B2 | 11/2004 | Dunphy et al. |
| 6,040,937 | A | 3/2000 | Miles | 6,825,835 | B2 | 11/2004 | Sano et al. |
| 6,049,317 | A | 4/2000 | Thompson et al. | 6,829,132 | B2 | 12/2004 | Martin et al. |
| 6,055,090 | A | 4/2000 | Miles | 6,853,129 | B1 | 2/2005 | Cummings et al. |
| 6,061,075 | A | 5/2000 | Nelson et al. | 6,855,610 | B2 | 2/2005 | Tung et al. |
| 6,099,132 | A | 8/2000 | Kaeriyama | 6,859,218 | B1 | 2/2005 | Luman et al. |
| 6,100,872 | A | 8/2000 | Aratani et al. | 6,861,277 | B1 | 3/2005 | Monroe et al. |
| 6,113,239 | A | 9/2000 | Sampsell et al. | 6,862,022 | B2 | 3/2005 | Slupe |
| 6,147,790 | A | 11/2000 | Meier et al. | 6,862,029 | B1 | 3/2005 | D'Souza et al. |
| 6,160,833 | A | 12/2000 | Floyd et al. | 6,867,896 | B2 | 3/2005 | Miles |
| 6,180,428 | B1 | 1/2001 | Peeters et al. | 6,870,581 | B2 | 3/2005 | Li et al. |
| 6,201,633 | B1 | 3/2001 | Peeters et al. | 6,903,860 | B2 | 6/2005 | Ishii |
| 6,232,936 | B1 | 5/2001 | Gove et al. | 7,034,783 | B2 * | 4/2006 | Gates et al. .................. 345/84 |
| 6,246,398 | B1 | 6/2001 | Koo | 7,123,216 | B1 * | 10/2006 | Miles ......................... 345/54 |
| 6,275,326 | B1 | 8/2001 | Bhalla et al. | 7,126,741 | B2 | 10/2006 | Wagner et al. |
| 6,282,010 | B1 | 8/2001 | Sulzbach et al. | 7,161,728 | B2 | 1/2007 | Sampsell et al. |
| 6,295,154 | B1 | 9/2001 | Laor et al. | 7,196,837 | B2 | 3/2007 | Sampsell et al. |
| 6,304,297 | B1 | 10/2001 | Swan | 7,236,284 | B2 * | 6/2007 | Miles ........................ 359/237 |
| 6,320,394 | B1 | 11/2001 | Tartagni | 7,310,179 | B2 * | 12/2007 | Chui et al. .................. 359/290 |
| 6,323,982 | B1 | 11/2001 | Hornbeck | 7,400,489 | B2 | 7/2008 | Van Brocklin et al. |
| 6,327,071 | B1 | 12/2001 | Kimura | 7,515,147 | B2 * | 4/2009 | Mignard ...................... 345/204 |
| 6,356,085 | B1 | 3/2002 | Ryat et al. | 7,626,581 | B2 * | 12/2009 | Chui et al. .................. 345/204 |
| 6,356,254 | B1 | 3/2002 | Kimura | 2001/0003487 | A1 | 6/2001 | Miles |
| 6,392,233 | B1 | 5/2002 | Channin et al. | 2001/0026250 | A1 * | 10/2001 | Inoue et al. .................. 345/22 |
| 6,429,601 | B1 | 8/2002 | Friend et al. | 2001/0034075 | A1 | 10/2001 | Onoya |
| 6,433,917 | B1 | 8/2002 | Mei et al. | 2001/0043171 | A1 | 11/2001 | Van Gorkom et al. |
| 6,447,126 | B1 | 9/2002 | Hornbeck | 2001/0046081 | A1 | 11/2001 | Hayashi et al. |
| 6,465,355 | B1 | 10/2002 | Horsley | 2001/0051014 | A1 | 12/2001 | Behin et al. |
| 6,466,358 | B2 | 10/2002 | Tew | 2002/0000959 | A1 | 1/2002 | Colgan et al. |
| 6,466,486 | B2 | 10/2002 | Kawasumi | 2002/0005827 | A1 | 1/2002 | Kobayashi |
| 6,473,274 | B1 | 10/2002 | Maimone et al. | 2002/0012159 | A1 | 1/2002 | Tew |
| 6,480,177 | B2 | 11/2002 | Doherty et al. | 2002/0015215 | A1 | 2/2002 | Miles |
| 6,480,645 | B1 | 11/2002 | Peale et al. | 2002/0024711 | A1 | 2/2002 | Miles |
| 6,496,122 | B2 | 12/2002 | Sampsell | 2002/0036304 | A1 | 3/2002 | Ehmke et al. |
| 6,501,107 | B1 | 12/2002 | Sinclair et al. | 2002/0050882 | A1 | 5/2002 | Hyman et al. |
| 6,507,330 | B1 | 1/2003 | Handschy et al. | 2002/0054424 | A1 * | 5/2002 | Miles ........................ 359/291 |
| 6,507,331 | B1 | 1/2003 | Schlangen et al. | 2002/0075226 | A1 | 6/2002 | Lippincott |
| 6,545,335 | B1 | 4/2003 | Chua et al. | 2002/0075555 | A1 | 6/2002 | Miles |
| 6,545,495 | B2 | 4/2003 | Warmack et al. | 2002/0093446 | A1 | 7/2002 | Horsley et al. |
| 6,548,908 | B2 | 4/2003 | Chua et al. | 2002/0093722 | A1 | 7/2002 | Chan et al. |
| 6,549,338 | B1 | 4/2003 | Wolverton et al. | 2002/0097133 | A1 | 7/2002 | Charvet et al. |
| 6,552,840 | B2 | 4/2003 | Knipe | 2002/0126364 | A1 | 9/2002 | Miles |
| 6,574,033 | B1 | 6/2003 | Chui et al. | 2002/0179421 | A1 | 12/2002 | Williams et al. |
| 6,589,625 | B1 | 7/2003 | Kothari et al. | 2002/0186108 | A1 | 12/2002 | Hallbjorner |
| 6,593,934 | B1 | 7/2003 | Liaw et al. | 2003/0004272 | A1 | 1/2003 | Power |
| 6,600,201 | B2 | 7/2003 | Hartwell et al. | 2003/0020699 | A1 | 1/2003 | Nakatani et al. |
| 6,606,175 | B1 | 8/2003 | Sampsell et al. | 2003/0043157 | A1 | 3/2003 | Miles |
| 6,625,047 | B2 | 9/2003 | Coleman, Jr. | 2003/0072070 | A1 | 4/2003 | Miles |
| 6,630,786 | B2 | 10/2003 | Cummings et al. | 2003/0122773 | A1 | 7/2003 | Washio et al. |
| 6,632,698 | B2 | 10/2003 | Ives | 2003/0137215 | A1 | 7/2003 | Cabuz |
| 6,643,069 | B2 | 11/2003 | Dewald | 2003/0137521 | A1 | 7/2003 | Zehner et al. |
| 6,650,455 | B2 | 11/2003 | Miles | 2003/0189536 | A1 | 10/2003 | Ruigt |
| 6,666,561 | B1 | 12/2003 | Blakley | 2003/0202264 | A1 | 10/2003 | Weber et al. |
| 6,674,090 | B1 | 1/2004 | Chua et al. | 2003/0202265 | A1 | 10/2003 | Reboa et al. |
| 6,674,562 | B1 | 1/2004 | Miles | 2003/0202266 | A1 | 10/2003 | Ring et al. |
| 6,680,792 | B2 | 1/2004 | Miles | 2004/0008396 | A1 | 1/2004 | Stappaerts |
| 6,710,908 | B2 | 3/2004 | Miles et al. | 2004/0022044 | A1 | 2/2004 | Yasuoka et al. |
| 6,741,377 | B2 | 5/2004 | Miles | 2004/0027701 | A1 | 2/2004 | Ishikawa |
| 6,741,384 | B1 | 5/2004 | Martin et al. | 2004/0036132 | A1 | 2/2004 | de los Santos |
| 6,741,503 | B1 | 5/2004 | Farris et al. | 2004/0051929 | A1 | 3/2004 | Sampsell et al. |
| 6,747,785 | B2 | 6/2004 | Chen et al. | 2004/0058532 | A1 | 3/2004 | Miles et al. |
| 6,750,876 | B1 | 6/2004 | Atsatt et al. | 2004/0080807 | A1 | 4/2004 | Chen et al. |
| 6,762,873 | B1 | 7/2004 | Coker et al. | 2004/0145049 | A1 | 7/2004 | McKinnell et al. |
| 6,775,174 | B2 | 8/2004 | Huffman et al. | 2004/0147056 | A1 | 7/2004 | McKinnell et al. |
| 6,778,155 | B2 | 8/2004 | Doherty et al. | 2004/0160143 | A1 | 8/2004 | Shreeve et al. |
| 6,781,643 | B1 | 8/2004 | Watanabe et al. | 2004/0174583 | A1 | 9/2004 | Chen et al. |
| 6,787,384 | B2 | 9/2004 | Okumura | 2004/0179281 | A1 | 9/2004 | Reboa |

| | | | |
|---|---|---|---|
| 2004/0209192 A1 | 10/2004 | Lin | |
| 2004/0212026 A1 | 10/2004 | Van Brocklin et al. | |
| 2004/0217378 A1 | 11/2004 | Martin et al. | |
| 2004/0217919 A1 | 11/2004 | Pichl et al. | |
| 2004/0218251 A1 | 11/2004 | Piehl et al. | |
| 2004/0218334 A1 | 11/2004 | Martin et al. | |
| 2004/0218341 A1 | 11/2004 | Martin et al. | |
| 2004/0223204 A1 | 11/2004 | Mao et al. | |
| 2004/0227493 A1 | 11/2004 | Van Brocklin et al. | |
| 2004/0240032 A1 | 12/2004 | Miles | |
| 2004/0240138 A1 | 12/2004 | Martin et al. | |
| 2004/0245588 A1 | 12/2004 | Nikkel et al. | |
| 2004/0263944 A1 | 12/2004 | Miles et al. | |
| 2005/0001828 A1 | 1/2005 | Martin et al. | |
| 2005/0012577 A1 | 1/2005 | Pillans et al. | |
| 2005/0017941 A1* | 1/2005 | Simon et al. | 345/98 |
| 2005/0038950 A1 | 2/2005 | Adelmann | |
| 2005/0057442 A1 | 3/2005 | Way | |
| 2005/0068583 A1 | 3/2005 | Gutkowski et al. | |
| 2005/0069209 A1 | 3/2005 | Damera-Venkata et al. | |
| 2005/0116924 A1 | 6/2005 | Sauvante et al. | |
| 2005/0168431 A1 | 8/2005 | Chui | |
| 2005/0206991 A1 | 9/2005 | Chui et al. | |
| 2005/0286113 A1 | 12/2005 | Miles | |
| 2005/0286114 A1 | 12/2005 | Miles | |
| 2006/0044246 A1 | 3/2006 | Mignard | |
| 2006/0044298 A1 | 3/2006 | Mignard et al. | |
| 2006/0044928 A1* | 3/2006 | Chui et al. | 365/232 |
| 2006/0056000 A1 | 3/2006 | Mignard | |
| 2006/0057754 A1 | 3/2006 | Cummings | |
| 2006/0066542 A1 | 3/2006 | Chui | |
| 2006/0066559 A1 | 3/2006 | Chui et al. | |
| 2006/0066560 A1 | 3/2006 | Gally et al. | |
| 2006/0066561 A1 | 3/2006 | Chui et al. | |
| 2006/0066594 A1 | 3/2006 | Tyger | |
| 2006/0066597 A1 | 3/2006 | Sampsell | |
| 2006/0066598 A1 | 3/2006 | Floyd | |
| 2006/0066601 A1 | 3/2006 | Kothari | |
| 2006/0066937 A1 | 3/2006 | Chui | |
| 2006/0066938 A1 | 3/2006 | Chui | |
| 2006/0067648 A1 | 3/2006 | Chui et al. | |
| 2006/0067653 A1 | 3/2006 | Gally et al. | |
| 2006/0077127 A1 | 4/2006 | Sampsell et al. | |
| 2006/0077505 A1 | 4/2006 | Chui et al. | |
| 2006/0077520 A1 | 4/2006 | Chui et al. | |
| 2006/0103613 A1 | 5/2006 | Chui | |
| 2007/0075942 A1 | 4/2007 | Martin et al. | |
| 2008/0191978 A1* | 8/2008 | Miles | 345/84 |
| 2009/0267934 A1* | 10/2009 | Chui et al. | 345/212 |

FOREIGN PATENT DOCUMENTS

| | | |
|---|---|---|
| EP | 0300754 A2 | 1/1989 |
| EP | 0306308 A2 | 3/1989 |
| EP | 0318050 A | 5/1989 |
| EP | 0 417 523 A | 3/1991 |
| EP | 0 467 048 A | 1/1992 |
| EP | 0570906 A | 11/1993 |
| EP | 0608056 A1 | 7/1994 |
| EP | 0655725 A1 | 5/1995 |
| EP | 0 667 548 A1 | 8/1995 |
| EP | 0725380 A1 | 8/1996 |
| EP | 0852371 A1 | 7/1998 |
| EP | 0911794 A1 | 4/1999 |
| EP | 1 017 038 A | 7/2000 |
| EP | 1 146 533 A | 10/2001 |
| EP | 1234567 A | 9/2003 |
| EP | 1343190 A | 9/2003 |
| EP | 1381023 A | 1/2004 |
| EP | 1473691 A2 | 11/2004 |
| GB | 2401200 A | 11/2004 |
| JP | 2002 175053 | 6/2002 |
| JP | 2004-29571 | 1/2004 |
| JP | 2004 004553 | 8/2004 |
| WO | WO 95/30924 | 11/1995 |
| WO | WO 97/17628 | 5/1997 |
| WO | WO 99/52006 A3 | 10/1999 |
| WO | WO 01/73937 A | 10/2001 |
| WO | WO 02/086582 | 10/2002 |
| WO | WO 03/007049 A1 | 1/2003 |
| WO | WO 03/015071 A2 | 2/2003 |
| WO | WO 03/044765 A2 | 5/2003 |
| WO | WO 03/060940 A | 7/2003 |
| WO | WO 03/069413 A1 | 8/2003 |
| WO | WO 03/073151 A1 | 9/2003 |
| WO | WO 03/079323 A | 9/2003 |
| WO | WO 03/090199 A1 | 10/2003 |
| WO | WO 2004/006003 A1 | 1/2004 |
| WO | WO 2004/026757 A2 | 4/2004 |
| WO | WO 2004/049034 A1 | 6/2004 |

OTHER PUBLICATIONS

Miles et al., 5.3: Digital Paper™: Reflective displays using interferometric modulation, SID Digest, vol. XXXXI, 2000 pp. 32-35.

Invitation to Pay Additional Fees dated Feb. 9, 2006.

Peroulis et al., Low contact resistance series MEMS switches, 2002, pp. 223-226, vol. 1, IEEE MTT-S International Microwave Symposium Digest, New York, NY.

International Preliminary Report on Patentability dated Mar. 8, 2007.

Bains, "Digital Paper Display Technology holds Promise for Portables", CommsDesign EE Times (2000).

Lieberman, "MEMS Display Looks to give PDAs Sharper Image" EE Times (2004).

Lieberman, "Microbridges at heart of new MEMS displays" EE Times (2004).

Seeger et al., "Stabilization of Electrostatically Actuated Mechanical Devices" (1997) International Conference on Solid State Sensors and Actuators, vol. 2, pp. 1133-1136.

Office Action dated Aug. 24, 2009 in U.S. App. No. 11/511,908.

Office Action received Sep. 5, 2008 in Chinese App. No. 200580028767.4.

Office Action received Feb. 27, 2009 in Chinese App. No. 200580028767.4.

Office Action dated Feb. 1, 2010 in U.S. Appl. No. 11/511,908.

Office Action dated Jul. 8, 2010 in U.S. Appl. 11/511,908.

Official Communication dated Apr. 15, 2010 in European App. No. 05790431.0.

* cited by examiner

| | Column Output Signals | |
|---|---|---|
| | $+V_{bias}$ | $-V_{bias}$ |
| Row Output Signals  0 | Stable | Stable |
| $+\Delta V$ | Release | Actuate |
| $-\Delta V$ | Actuate | Release |

DRIVE METHOD FOR MEMS DEVICES

CROSS-REFERENCE TO RELATED APPLICATIONS

This application is a continuation-in-part of both U.S. application Ser. No. 11/027,693, titled "SYSTEM AND METHOD OF SENSING A STATE OF AN INTERFEROMETRIC MODULATOR", filed Dec. 30, 2004 now abandoned and U.S. application Ser. No. 11/026,555, titled "SYSTEM AND METHOD FOR ELECTRICALLY ISOLATING A PLURALITY OF INTERFEROMETRIC MODULATORS IN A HOLD MODE", filed Dec. 30, 2004 now abandoned. This application further claims the benefit of U.S. Provisional Application No. 60/646,053, titled "DRIVE METHOD FOR MEMS DEVICES", filed Jan. 21, 2005; U.S. Provisional Application No. 60/604,892, titled "SENSING STATUS OF A MEMS MEMORY DEVICE", filed Aug. 27, 2004; U.S. Provisional Application No. 60/614,032, titled "SYSTEM AND METHOD FOR INTERFEROMETRIC MODULATION", filed Sep. 27, 2004; and U.S. Provisional Application No. 60/604,893, titled "CURRENT MODE DISPLAY DRIVER", filed Aug. 27, 2004. All of these patent applications are incorporated by reference in their entireties.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In certain embodiments, an array of light modulators are arranged at intersections of rows and columns of electrodes and comprises a substrate, at least one first electrode having a first electrical resistance, and at least one second electrode having a second electrical resistance and crossing the at least one first electrode to form at least one light modulator at the intersection(s) of the at least one first electrode and the at least one second electrode, wherein the second electrical resistance is less than the first electrical resistance. The array further comprises a driving circuit having outputs connected to the at least one first electrode and to the at least one second electrode and being configured to apply a potential difference of a first polarity across at least one light modulator during a first phase and then quickly transition to applying a bias voltage having a polarity opposite to the first polarity across at least one light modulator during a second phase wherein the driving circuit applies a first voltage to the at least one first electrode during the first phase and a second voltage to the at least one first electrode during the second phase, and applies a third voltage to the at least one second electrode during the first phase and a fourth voltage to the at least one second electrode during the second phase wherein an absolute value of the difference between the first voltage and the second voltage is less than an absolute value of the difference between the third voltage and the fourth voltage.

In certain embodiments, an array of light modulators are arranged at intersections of rows and columns of electrodes and comprise a substrate, at least one first electrode having a first electrical resistance, and at least one second electrode having a second electrical resistance and crossing the at least one first electrode to form at least one light modulator at the intersection(s) of the at least one first electrode and the at least one second electrode wherein the second electrical resistance is less than the first electrical resistance. The array further comprises a driving circuit configured to apply a first voltage to the at least one first electrode during a first phase and apply a second voltage to the at least one first electrode during a second phase, and configured to apply a third voltage to the at least one second electrode during the first phase and apply a fourth voltage to the at least one second electrode during the second phase wherein an absolute value of the difference between the first voltage and the second voltage is less than the absolute value of the difference between the third voltage and the fourth voltage wherein the first voltage and the third voltage form an electric field between the at least one first electrode and the at least one second electrode pointing in a first direction and wherein the second voltage and the fourth voltage form an electric field between the at least one first electrode and the at least one second electrode pointing in a direction opposite to the first direction.

In certain embodiments, a method drives an array of light modulators arranged at intersections of rows of electrodes and columns of electrodes. The method comprises actuating a light modulator by applying a first potential difference having a first polarity across at least one light modulator during a first phase, wherein the first potential is greater than a bias voltage and maintaining the at least one light modulator in the actuated state by applying a second potential difference having the first polarity across the at least one light modulator during a second phase, wherein the second potential is substantially equal to the bias voltage. The method further comprises applying a third potential difference opposite to the first polarity across the at least one light modulator during a third phase and wherein one of the columns of electrodes or the rows of electrodes forming the at least one light modulator has a higher conductivity and experiences a larger voltage shift between the first and third phases than the other one of the columns of electrodes and the rows of electrodes.

In certain embodiments, a system writes data to a MEMS display element of an array, the system comprises a first set of electrodes characterized by a first resistivity, a second set of electrodes characterized by a second resistivity and crossing the first set of electrodes, and a driver circuit having outputs for applying voltages to the first and second sets of crossing and intersecting electrodes. The system further comprises herein the driver circuitry is configured to periodically actuate at least one element of the array with a potential difference having a first polarity, and maintain the at least one element in an actuated state when transitioning to a bias voltage having an opposite polarity wherein an absolute value of the difference between voltages applied to the row electrode before and after the transition is less than an absolute value of the difference between voltages applied to the column electrode before and after the transition.

Certain embodiments include a display. The display comprises at least one driving circuit and an array comprising a plurality of interferometric modulators. Each of the interferometric modulators is connected to a column electric line and a row electrical line. The interferometric modulators are configured to be driven by the driving circuit. A plurality of circuits is connected between the driver and each of columns of electrical lines and the row of electrical lines. The circuits are configured to electrically isolate the array from the driving circuit.

Certain embodiments include a method of controlling a display. The method includes applying a bias voltage to an array of interferometric modulators; and electrically isolating the array of interferometric modulators from at least one driving circuit.

Yet other embodiments include a display. The display may include at least one driving circuit and an array comprising a plurality of bi-stable elements. Each of the bi-stable elements is connected to a column electric line and a row electrical line. The bi-stable elements are configured to be driven by the driving circuit. A plurality of circuits is connected between the driver and each of columns of electrical lines and the row of electrical lines. The circuits are configured to electrically isolate the array from the driving circuit.

In certain embodiments, the invention includes a method of determining an operational state of a microelectromechanical device. The method may include applying an electrical signal to at least one electrode coupled to the device, detecting at least one capacitance dependent response of the device, and determining, based at least in part on the response, a state of the device.

In certain embodiments, a display system includes an array of microelectromechanical pixels, row and column driver circuitry configured to apply electrical signals to the pixels, and a sensor, configured to sense a capacitance dependent response to at least some of the electrical signals. The sensor may include a comparator in some embodiments.

In certain embodiments, in an array of microelectromechanical devices formed in rows and columns at the intersections of a series of row electrodes and a series of column electrodes, a method of determining an operational state of a selected one of the microelectromechanical devices located in one row of the array, at one column of the array, is provided. In one such embodiment, the method includes isolating from column driver circuitry substantially every column electrode of the array except the column electrode connected to the selected device and isolating from row driver circuitry substantially every row electrode of the array except the row electrode connected to the selected device. An electrical signal is applied to the row electrode connected to the selected device, and at least one capacitance dependent response of the row electrode is detected. An operational state of the selected device is determined based at least in part on the response.

In certain embodiments, a method includes measuring overall capacitive characteristics of the row containing the selected device, determining selected device testing parameters based at least in part on the measurements, testing the selected device using the determined testing parameters, and thereby determining an operational state of the selected device.

In certain embodiments, a system for detecting a state of at least one display pixel, the system includes driver circuits coupled to the display and means for measuring a voltage across a display pixel. The system may additionally include means for determining, based upon the measured voltage, a state of the pixel.

In addition, a method of writing data to a portion of an array of microelectromechanical elements includes applying a set of data signals to a series of column electrodes of the array, applying at least one write waveform to a row electrode, determining an actuation state of at least one element along the row, and applying at least one additional write waveform to the row electrode if it is determined that an actuation state of at least one element along the row is not consistent with the data signals.

DETAILED DESCRIPTION OF CERTAIN EMBODIMENTS

An exemplary array of MEMS interferometric modulators are arranged at intersections of rows and columns of electrodes. The column electrode has a lower electrical resistance than the row electrode. A driving circuit applies a potential difference of a first polarity across the column and row electrodes during a first phase and then quickly transition to applying a bias voltage having a polarity opposite to the first polarity during a second phase. More specifically, the driving circuit applies a first voltage to the row electrode during the first phase and a second voltage to the row electrode during the second phase. The driving circuit applies a third voltage to the column electrode during the first phase and a fourth voltage to the column electrode during the second phase.

It has been found that the transition between the first phase and the second phase preferably occurs quickly because the polarity of the voltage across the row and column electrodes is swinging from a positive voltage in one direction to a negative voltage in the opposite direction. Preferably, the voltage swing happens fast enough that an actuated pixel located at the intersection of the row and column electrodes experiences this polarity reversal does not release as the potential across the pixel passes through zero on its way to the other hysteresis window. Thus, an absolute value of the difference between the voltages applied to the row electrode is less than an absolute value of the difference between the voltages applied to the column electrode.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
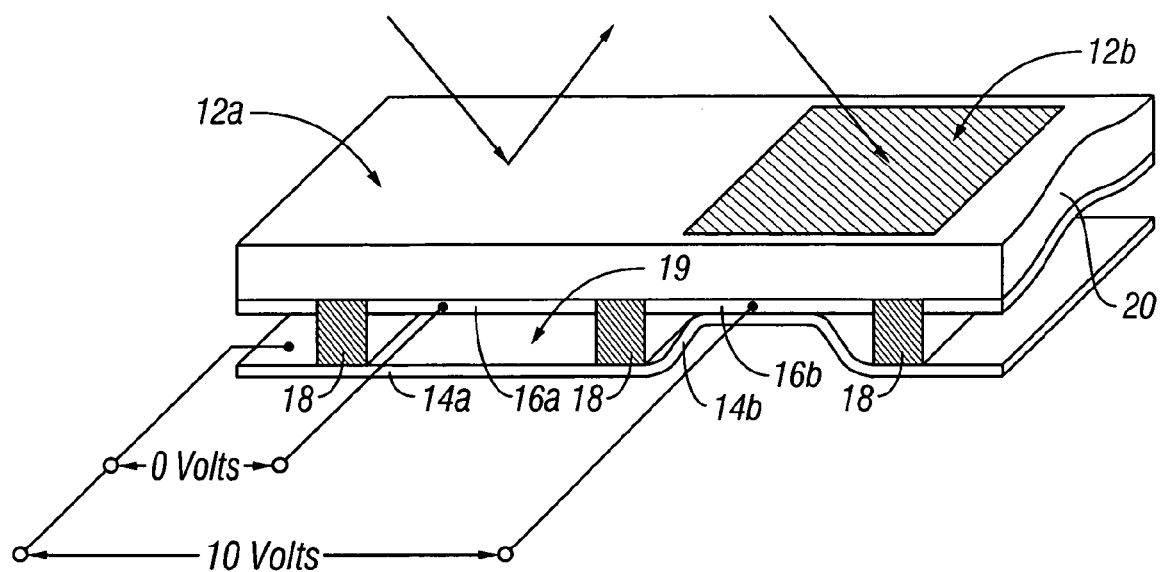
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
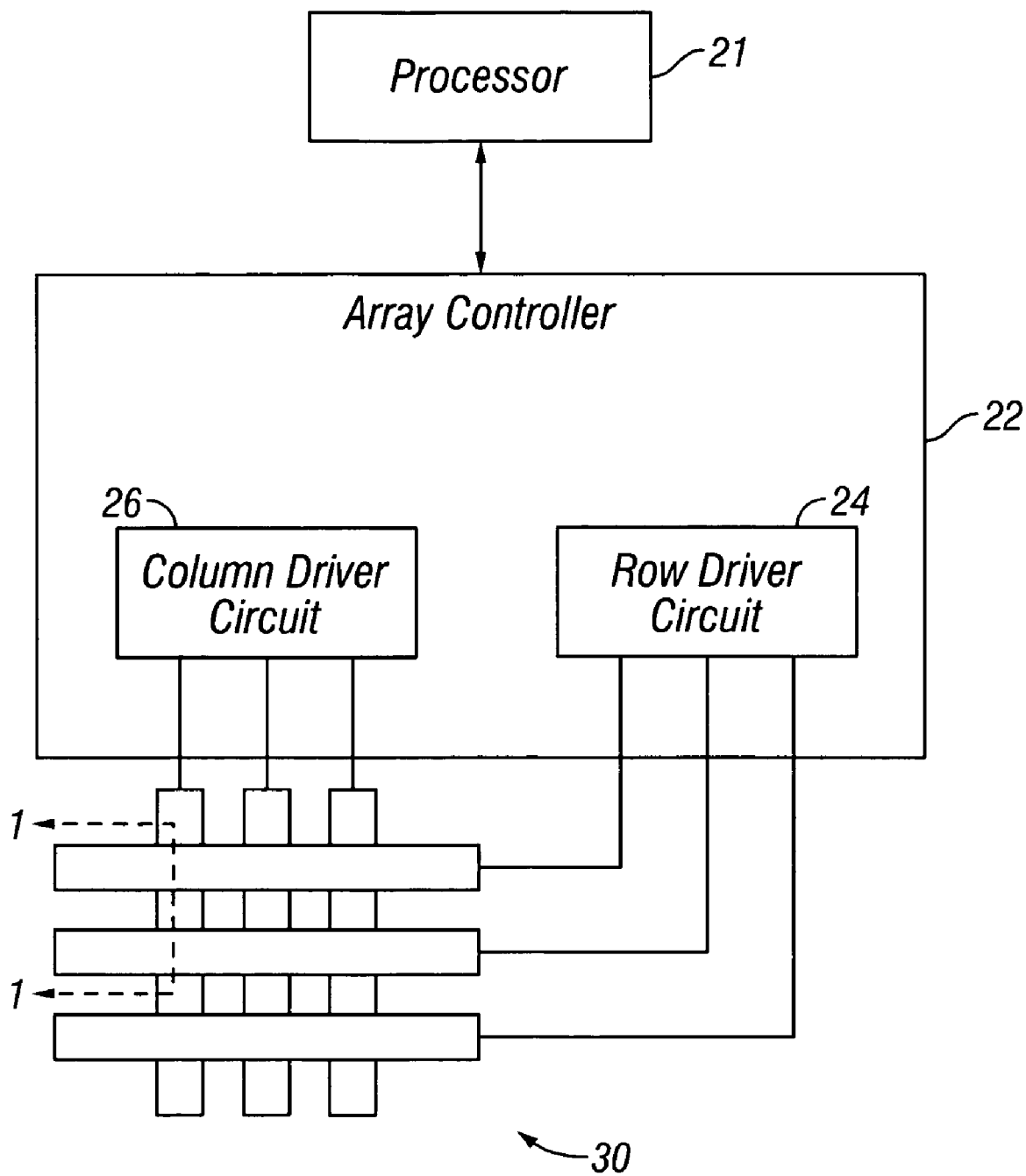
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, PentiumII®, PentiumIII®, PentiumIV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. In other embodiments, the row driver circuit 24 and the column driver circuit 26 are combined into a driving circuit which applies voltages to both the movable layers 14 and the fixed layers 16 of the array.

The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
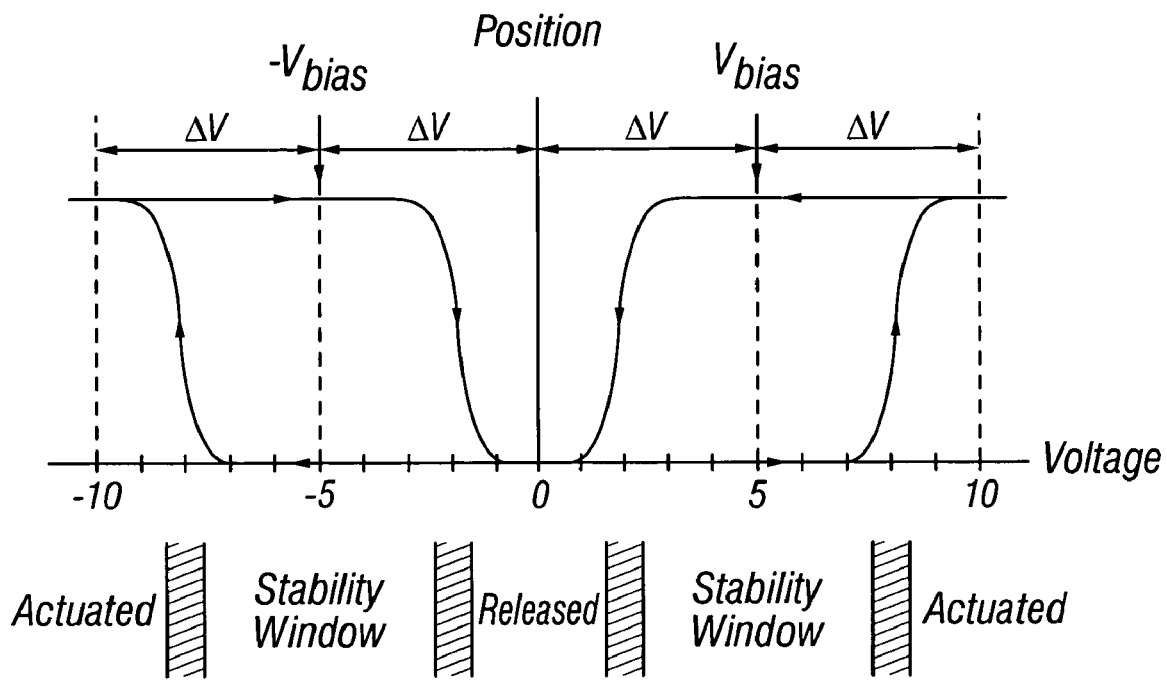
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
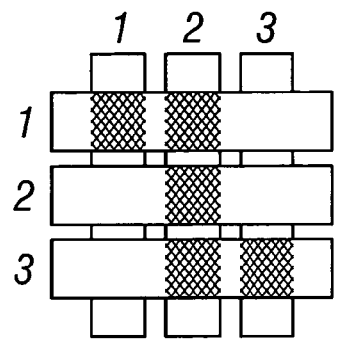
FIGS. 5A and 5B illustrate one exemplary timing diagram for row and column signals that may be used to write a frame of display data to the 3×3 interferometric modulator display of FIG. 2.
Figure 5B:
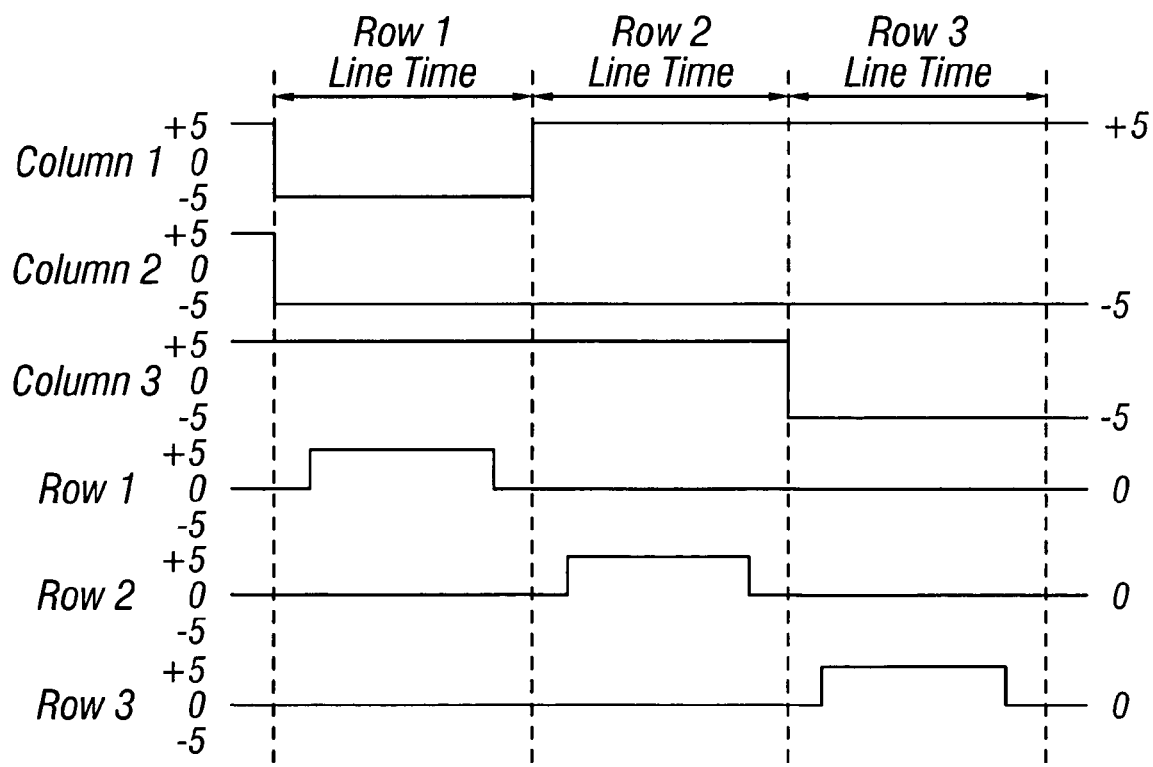

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
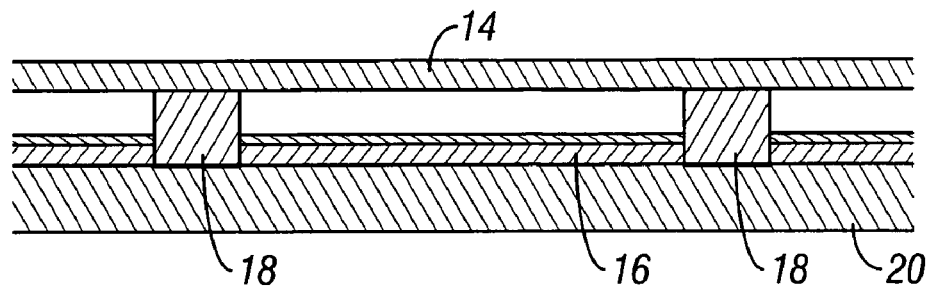
FIG. 6A is a cross section of the device of FIG. 1.
Figure 6B:
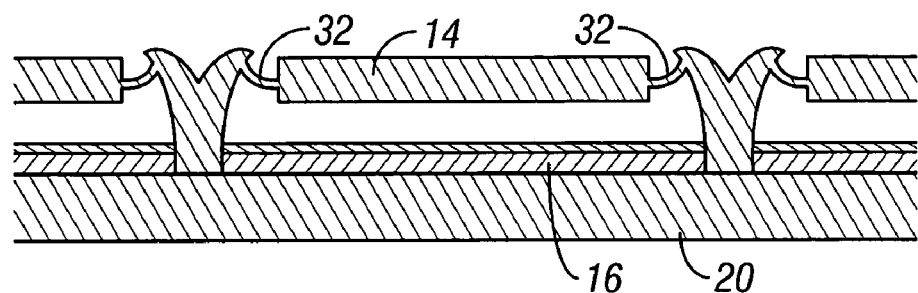
FIG. 6B is a cross section of an alternative embodiment of an interferometric modulator.
Figure 6C:
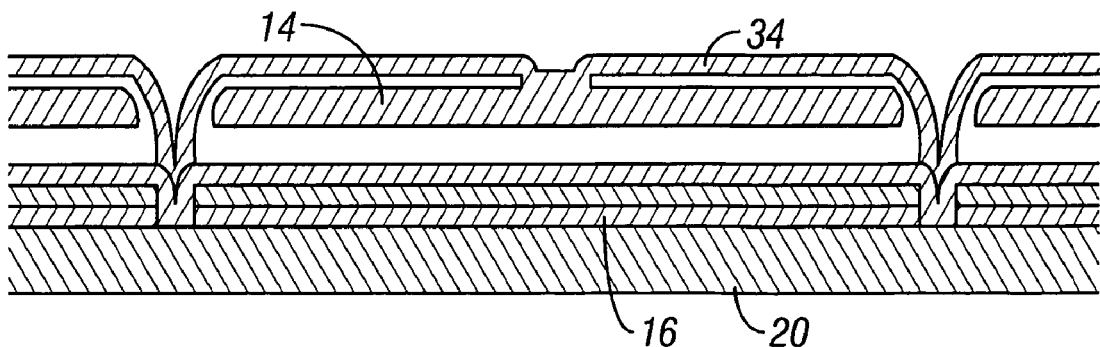
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG.

6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Referring back to FIG. 5B, it can be seen that the column voltages swing between +5 volts and −5 volts between phases of the writing process. For example, during a first phase the driving circuit applies +5 volts to the column electrode. During a subsequent or second phase, the driving circuit applies −5 volts to the column electrode. These transitions between +5 volts and −5 volts preferably occur quickly because the polarity of the voltage across the pixel is swinging from 5 volts in one direction to 5 volts in the opposite direction, and this should happen fast enough that an actuated pixel that experiences this polarity reversal does not release as the potential across the pixel passes through zero on its way to the other hysteresis window. Thus, the polarity reversal should happen significantly faster than the mechanical response time of an actuated pixel. When this is the case, the deformed reflective layer will stay deformed long enough for the voltage to swing back to the 5 V bias voltage, where the electrostatic force returns and continues to hold the pixel in the actuated state.

The necessary speed is much easier to accomplish if the electrode to which these voltage swings are applied has a low electrical resistance. A low electrical resistance minimizes the RC charging time constant of the pixels, and allows the voltage across each pixel to swing rapidly in response to the drive potentials applied by the driving circuit.

As further described above, one set of electrodes may be fabricated from chromium and indium-tin-oxide, and the other from aluminum. Typically, the aluminum electrodes have a much lower resistance than the chrome/ITO electrodes. It is therefore advantageous to apply any polarity reversing swings of potential to the aluminum electrodes rather than to the chrome/ITO electrodes. Thus, in the embodiment described above, the deformable aluminum layers are used as the column electrodes because they receive these rapid voltage swings from the driving circuit between phases. In other drive schemes, the row electrodes may be subject to polarity reversing voltage swings. In these embodiment, the low resistance layer would be attached to the row driver.

In one embodiment, the invention comprises an array of MEMS devices at the intersections of a set of row electrodes and a set of column electrodes. One of the set of row electrodes or set of column electrodes has a lower electrical resistance than the other. A row drive circuit is connected to the row electrodes, and a column drive circuit is connected to the column electrodes. In certain embodiments, the row drive circuit and the column drive circuit are combined in a single driving circuit. Outputs from the driving circuit are connected to the row electrode and the column electrode.

The MEMS devices are driven with voltage signals applied to the row and column electrodes. The set of voltages applied to one of the set of row electrodes or the set of column electrodes includes voltage swings that cause the polarity and magnitude of the voltage across at least some of the MEMS devices to swing from a stable bias potential of one polarity to a stable bias potential of the opposite polarity. The set of electrodes with the lower resistance is coupled to the set of voltages that includes voltage swings that cause the polarity and magnitude of the voltage across at least some of the MEMS devices to swing from a stable bias potential of one polarity to a stable bias potential of the opposite polarity.

For example, the driving circuit applies a potential difference of a first polarity across at least one MEMS device during a first phase and then quickly transitions to applying a bias voltage having a polarity opposite to the first polarity across the at least one MEMS device during a second phase. More specifically during the first phase, the driving circuit applies a first voltage to a first electrode and a third voltage to a second electrode having a lower electrical resistance than the first electrode. The first and third voltages together form the potential difference of the first polarity across the at least MEMS device the first phase.

During the second phase, the driving circuit applies a second voltage to the first electrode and a fourth voltage to the second electrode. The second and fourth voltages form the bias voltage having the polarity opposite to the first polarity across the at least MEMS device the second phase. With an absolute value of the difference between the first and second voltages being less than an absolute value of the difference between the third and fourth voltages, the second electrode which has the lower electrical resistance experiences higher voltage swings than the first electrode.

In certain embodiments, the first voltage is substantially equal to the second voltage and is between the third voltage and the fourth voltage. For example, the first and second voltages are zero and the third and fourth voltages are −5 volts and +5 volts, respectively. Continuing with this example, two times a 5 volt bias voltage is substantially equal to the absolute value of the difference between the third voltage and the fourth voltage.

Figure 7:
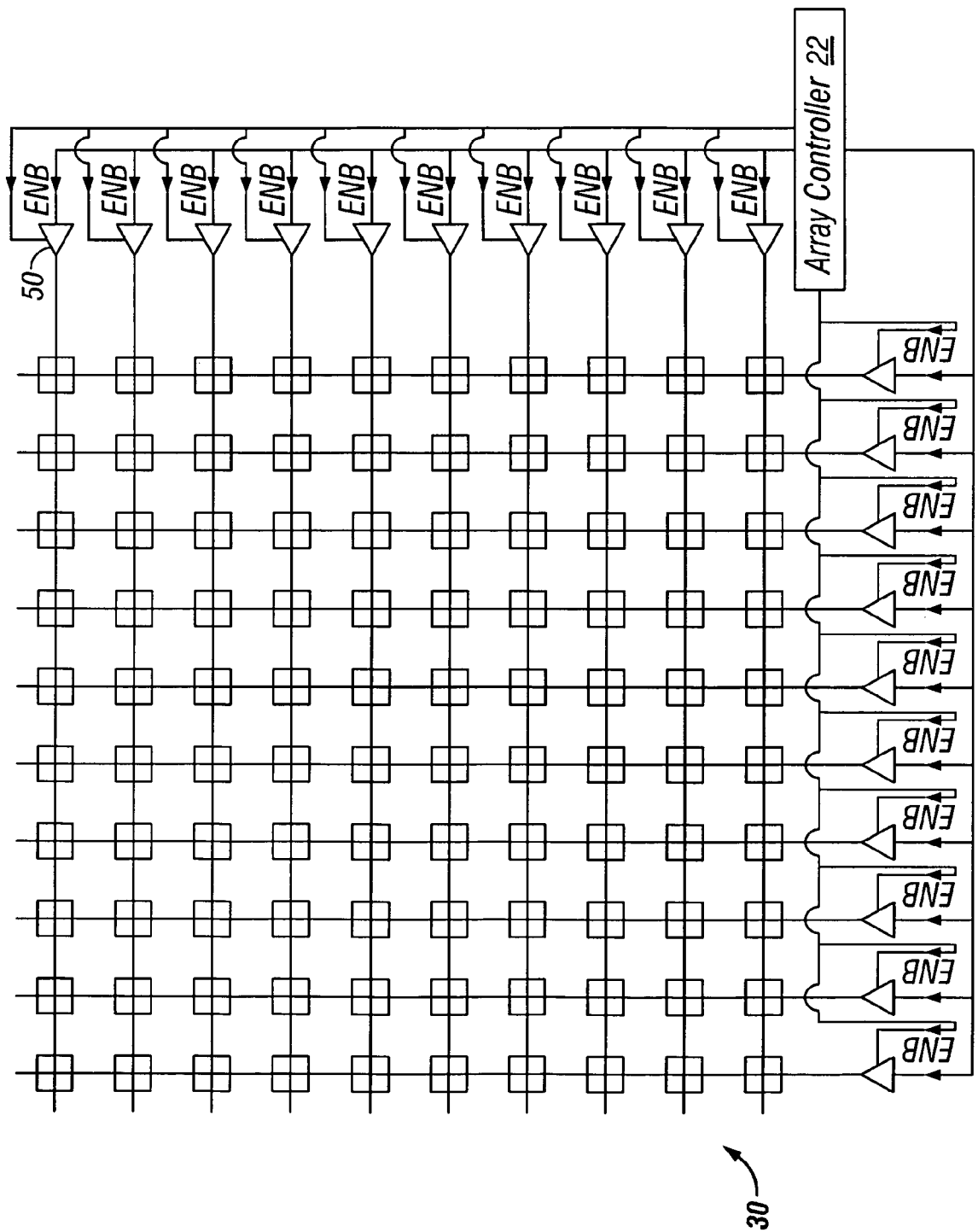
FIG. 7 is a partial schematic diagram of one embodiment of a bi-stable display device, such as an interferometric modulator display incorporating tri-state buffers in the driver circuit.

FIG. 7 is a partial schematic diagram of one embodiment of a MEMS array such as an interferometric modulator display array as described above. As discussed above with respect to FIGS. 2-5, the elements of the array are stable in either the actuated state or the released state if an appropriate bias voltage is applied across the electrodes. In the example above, the elements are stable if the rows are at +5 V, and the columns are anywhere between −2 and +2 volts. In the embodiment of FIG. 7 the driver circuit includes a plurality of tri-state buffers 50 provided on each of the columns and each of the rows of array. Each of the tri-state buffers 50 are connected to a hold-mode select line from the array controller 22. When the hold-mode select line is asserted, all lines from the driver to the display 30 are placed in a high impedance state, essentially eliminating any return path to the array controller 22. If a row or frame has been written, and the applied voltages are within the stability window for the elements of the array, these tri-state buffers 50 can be opened, and the pixels are then held at the previously held bias voltage, until the charge slowly dissipates, either across the pixel or through a non-infinite tri-state open resistance. While the buffers are open, the analog portion of the array controller 22 and any DC-DC charge pumps supplying analog voltages may be turned off until the charge on the elements dissipate to the point where the residual voltage falls outside the stability window. Because a pixel element can be charged by the driver in a small fraction of the time it takes for the charge to bleed excessively through an open buffer (about 1 G-ohm open state impedance), the charge pumps and analog circuitry in the array controller can be cycled into the off state during a significant fraction of the total display operation time, significantly reducing power consumption. This cycling can occur during maintenance of a display of a static frame, between row strobes during the write process, etc.

Figure 8:
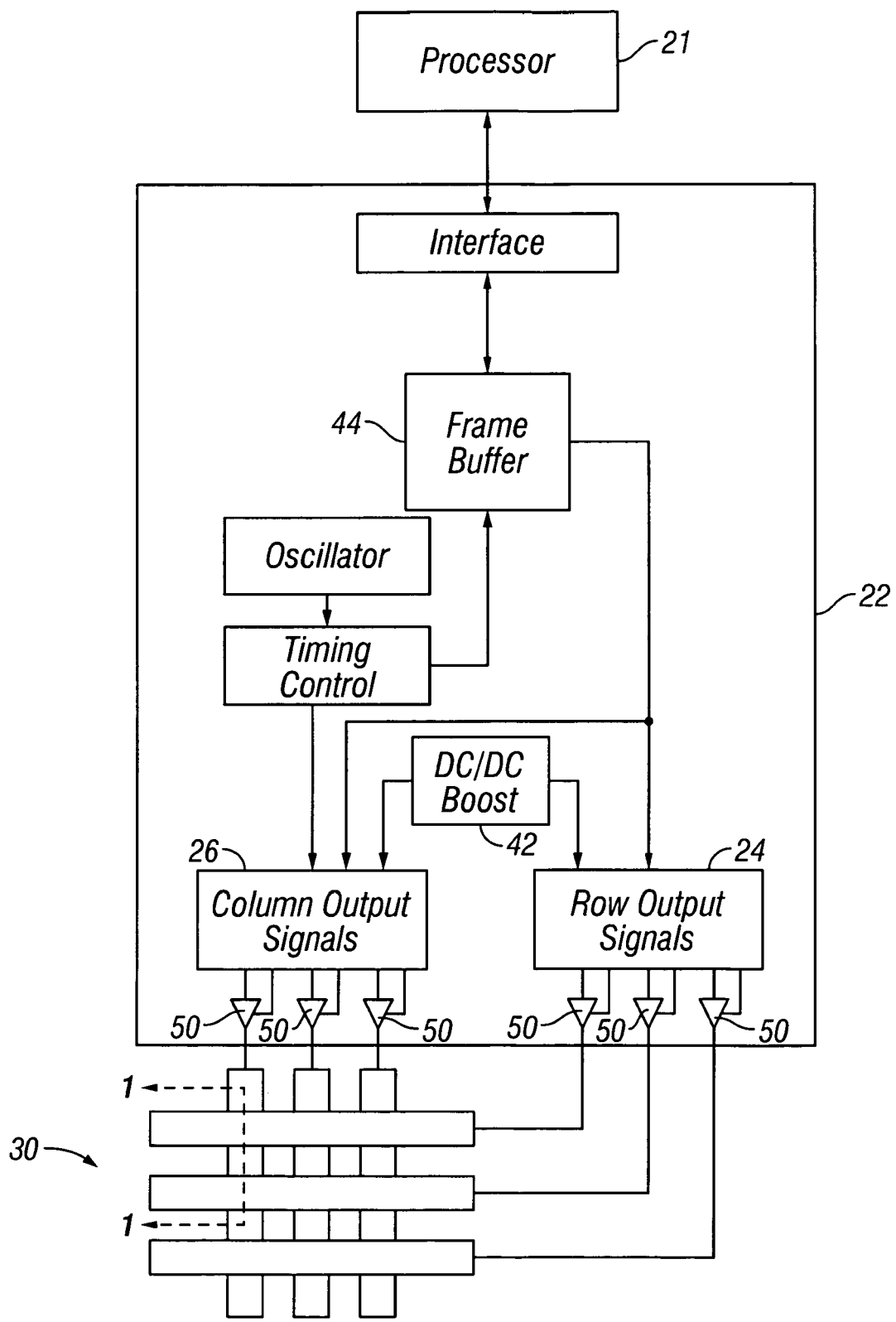
FIG. 8 illustrates the system of FIG. 2 incorporating tri-state isolating buffers.

FIG. 8 shows the array controller of FIG. 2 comprising a plurality of tri-state buffers 50. The plurality of tri-state buffers 50 are advantageously provided on each of the columns and each of the rows of array 30. The tri-state buffers 50 are connected to hold-mode signals which open the connection between the respective row or column of the array when they are asserted. When the hold-mode select lines are asserted, lines from the driver to the array are opened, substantially eliminating any leakage path for the charge stored on each pixel capacitance. The pixels are thus held in the previously charged or discharged state without any driver input, until the charge slowly dissipates, either through leakage across the pixel or through a non-infinite tri-state open resistance. With the plurality of tri-state buffers 50, the open or closed state of the rows and columns can be individually controlled as desired. As with FIG. 7, it will be appreciated that any controllable series switch such as a series FET could be used to implement this display/driver decoupling.

The array controller 22 may also include a boost circuit 42 for converting control signals to a voltage sufficient for driving the array 30. In one embodiment, the array controller 22 also includes a frame buffer 44. The frame buffer 44 typically includes sufficient memory to store the current displayed frame for refresh purposes. Portions of the array controller 22 as well as additional circuitry and functionality may be provided by a graphics controller which is typically connected between the actual display drivers and a general purpose microprocessor. Exemplary embodiments of the graphics controller include 69030 or 69455 controllers from Chips and Technology, Inc., the S1D1300 series from Seiko Epson, and the Solomon Systech 1906.

Figure 9:
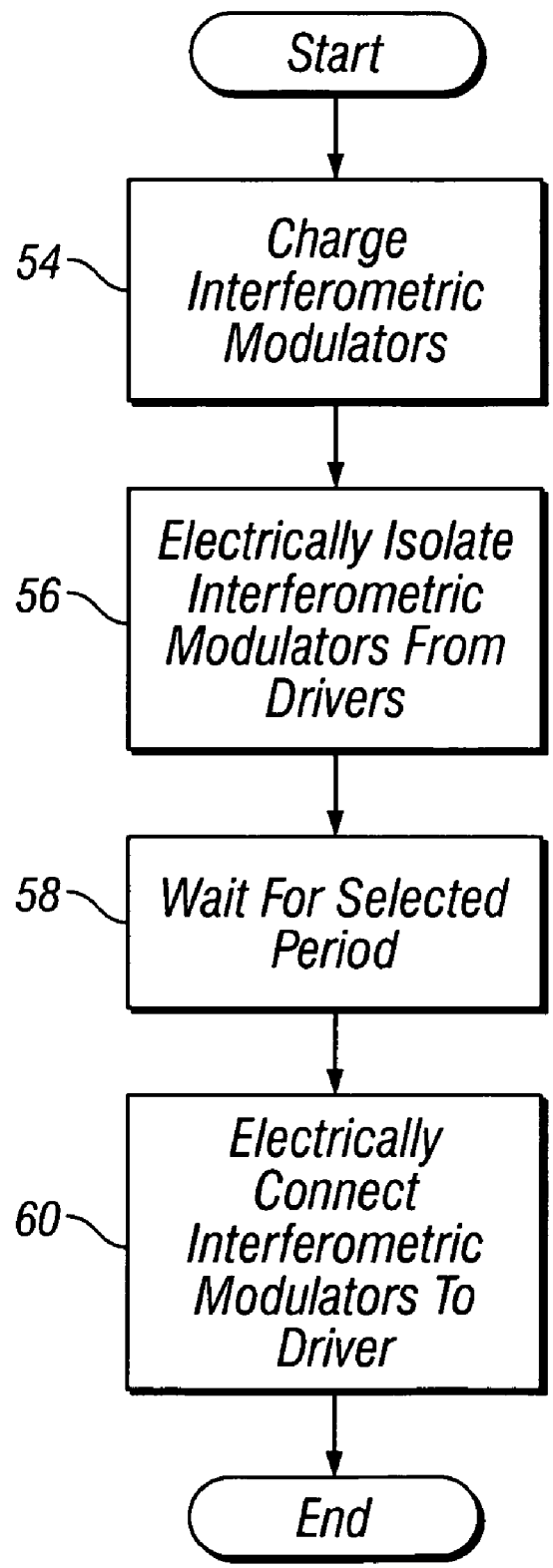
FIG. 9 is a flowchart illustrating a process of operating a display incorporating tri-state buffers in the driver circuit.

FIG. 9 is a flowchart illustrating an exemplary process operating the display of FIG. 7 or 8. Advantageously, activating a plurality of tri-state buffers 50, the state of the interferometric modulators may be maintained with low power dissipation. Depending on the embodiment, additional steps can be added, others removed, and the sequence of steps rearranged to the steps shown in FIG. 9.

Starting a step 54, each of the interferometric modulators in the pixels are charged. In one embodiment, the bias voltage used prior to disconnecting the array is increased to be closer to the actuation voltage, rather than right in the middle of the hysteresis window. For example, in the embodiment of FIGS. 2-5, prior to array decoupling, the row voltages could be +5 volts, and the column voltages could be set to −2 volts, rather than 0 volts. In these embodiments, the interferometric modulators are charged proximate to but not higher than the actuation voltage for the respective interferometric modulators, .e.g., 75%, 90%, or 95%, of the actuation voltage. Thus, the pixels are highly charged but the voltage differential for any of interferometric modulators should not cause a change in state for any of the released elements of the array.

Continuing to a step 56, the interferometric modulators are electrically isolated from the array controller 22. In one embodiment, the tri-state buffers 50 are activated so as to cut the lines from the array controller 22 to the array elements. Next, at a step 58, the array controller 22 powers down at least a portion of its power consuming circuitry and waits for a selected period which will depend on the RC time constant of the circuit with the tri-state buffer open. In some embodiments, capacitance values will be in the picofarad range, and the resistance in the 1000 Mohm range, putting the time constant in the millisecond range. Thus, in some embodiments, the duration of the off period is about 1 to 10 msec. Other exemplary time durations include at least 0.5 seconds and at least two seconds for high capacitance arrays. In one embodiment, the selected period is user-definable.

Moving to a step 60, the interferometric modulators are reconnected to the array controller 22. In one embodiment, the process of FIG. 9 is repeated during the course of image display and modification.

After a pixel is written, it can be advantageous to sense its state. For the bi-stable display of FIG. 1, the state of a pixel can be determined by taking advantage of the fact that the capacitance across the pixel mirrors is much larger, often about ten times larger, when the pixels are in the actuated state than when they are in the released state. This pixel capacitance value can be sensed in a variety of ways by sensing capacitance dependent electrical properties of the pixel, some of which are described in more detail below.

Figure 10:
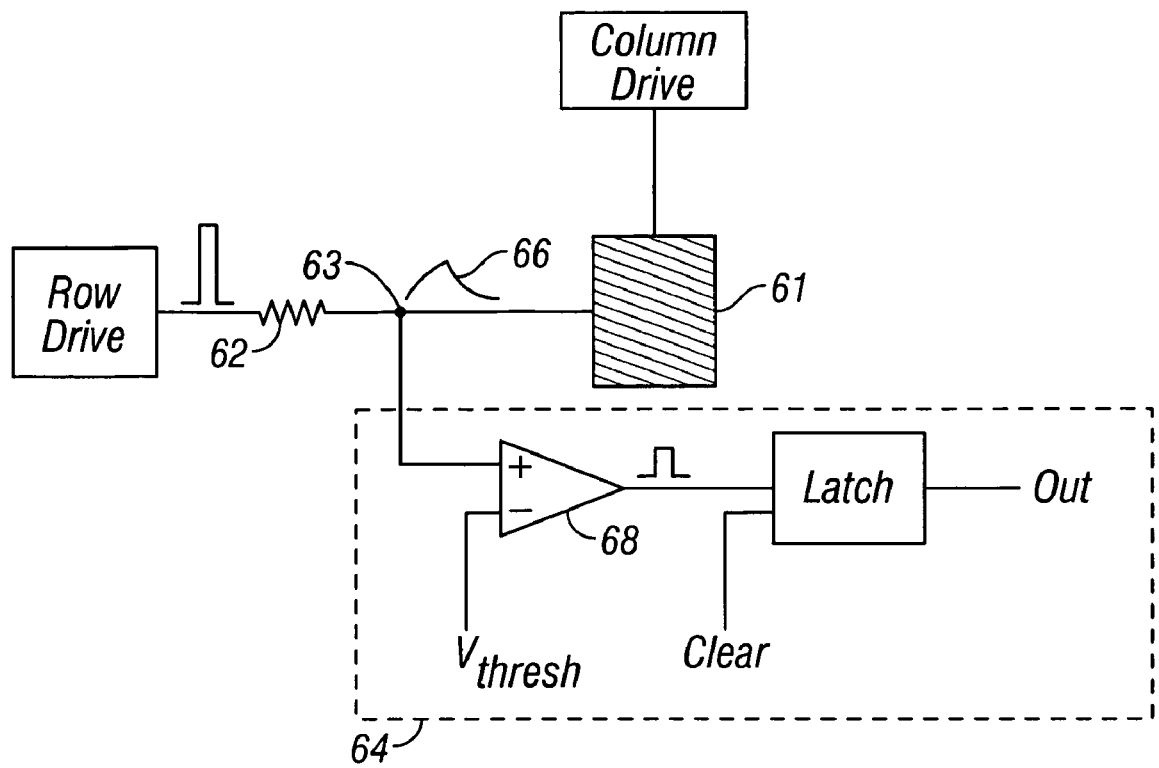
FIG. 10 is a schematic/block diagram of one embodiment of a state sensing circuit.
Figure 11:
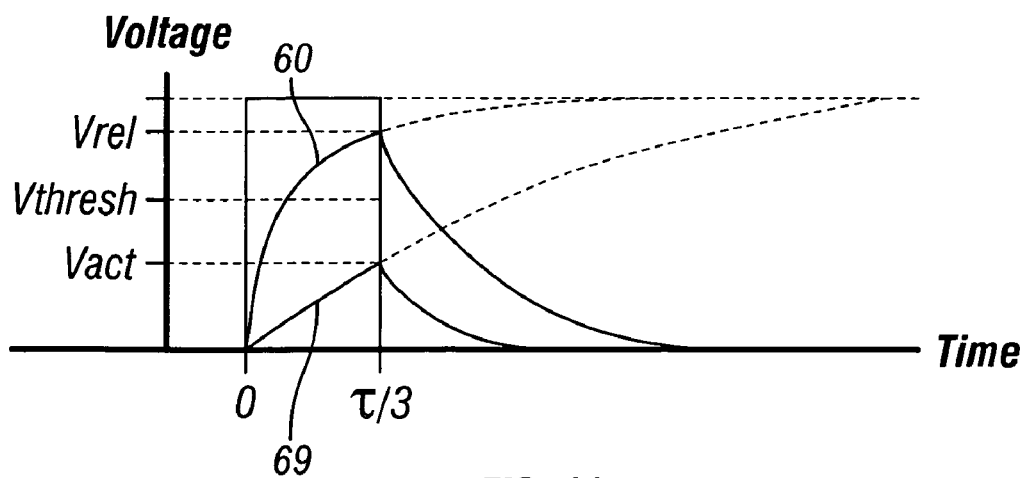
FIG. 11 is graph illustrating a voltage vs. time response to a voltage pulse for an inteferometric modulator.

The principles of pixel state sensing will be described first with reference to a single pixel in isolation as illustrated in FIGS. 10-14. Referring now to FIG. 10, after pixel writing, whether the whole frame is complete or prior to that time, all the column tri-state buffers can be placed in the open (decoupled) configuration except one column containing the pixel to be tested. The row driver then applies a low amplitude pulse to the row electrode containing the pixel to be tested, which charges up in response to the increased voltage. As shown in FIG. 11, the voltage across the pixel will increase in response to this applied voltage in accordance with the RC time constant ($\tau$) of the circuit. For a single pixel in isolation, the capacitance is the capacitance of the pixel 61, and the resistance of the circuit may include the row driver output impedance and/or any filter resistor 62 that might be placed in series with the row electrode. The voltage at the test point 63 when the pixel 61 is in a low capacitance state (e.g. in the released state) will increase faster as illustrated by curve 60 than when the pixel 61 is in a high capacitance state (e.g. in the actuated state) as illustrated by curve 69. If the voltage across the pixel is determined at a certain time during this charging period, at $\tau/3$ for example, the state of the pixel can be determined. This voltage can be detected and measured by a voltage sensing circuit 64. If a pulse having a duration of $\tau/3$ is applied to the pixel, the voltage across the pixel will increase and decrease as shown in the trace 66 (also shown in FIG. 11). If this signal is applied to the input of a comparator 68 with $V_{thresh}$ applied to the negative input, a pulse will be output from the comparator only if the voltage across the pixel exceeded $V_{thresh}$ at some time during the pulse, where $V_{thresh}$ is defined as shown in FIG. 11. The output of the comparator 68 can be latched to produce an indication of whether that pixel is actuated (latch low) or released (latch high).

Figure 12:
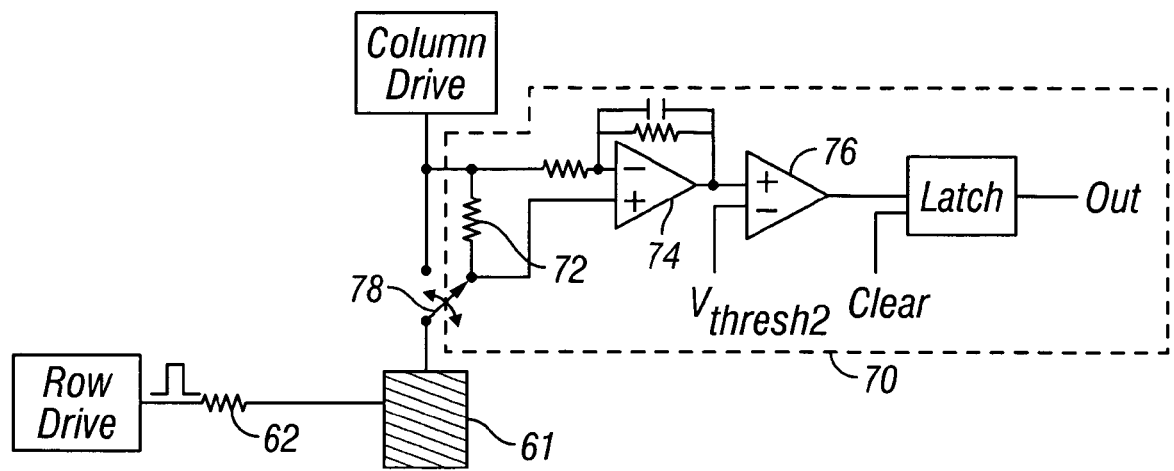
FIG. 12 is a schematic/block diagram of another embodiment of a state sensing circuit.
Figure 13:
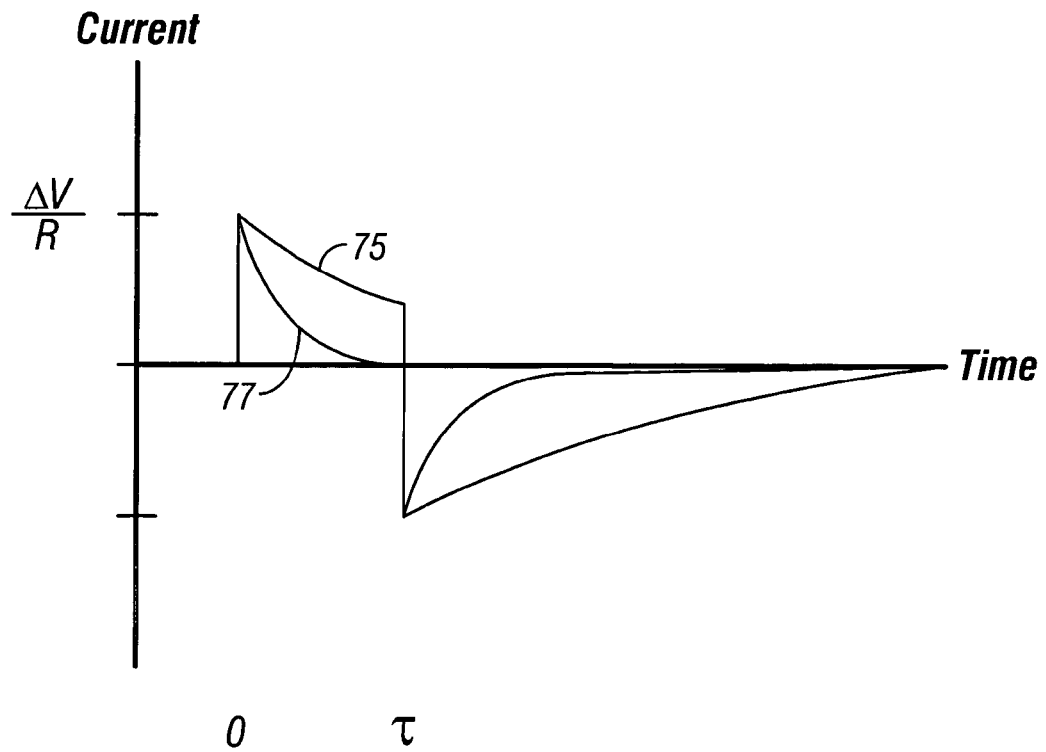
FIG. 13 is graph illustrating a current vs. time response to a voltage pulse for an inteferometric modulator.

FIGS. 12 and 13 illustrate an alternative method of detecting pixel state. In FIG. 12, a current sensing circuit 70 is used rather than a voltage sensing circuit. A voltage pulse is applied as above, which causes a current pulse as the pixel capacitance charges. As illustrated in FIG. 13, this current pulse decays slower (curve 75) for a larger capacitance of pixel 61 than for a smaller capacitance (curve 77). The current pulse can be converted to a voltage pulse by measuring the voltage across a series resistance 72 in the column line (amplifiers configured as current to voltage converters could also be used). The voltage across the resistor can be sensed by an amplifier configured as an integrator 74 illustrated in FIG. 12. The output of the integrator can be routed to a similar comparator 76 and latch as is FIG. 10. The comparator 76 will only produce an output pulse if the current pulse through the circuit is sufficient (given the value of the resistor 72 and the time constant/amplification of the integrator 74) to produce a voltage at the comparator input greater than a threshold voltage $V_{thresh2}$ shown in FIG. 12. FIG. 12 shows a switch 78 used to switch resistance 72 into the column line, but it will be appreciated that this would not be necessary if a suitable filter resistor, for example, was already present.

Current sensing requires a slightly more complicated circuit than voltage sensing, but one advantage would be that all the pixels in a row could be probed by a single pulse since the charging current could be separately measured for each pixel along a row simultaneously with separate current sensors. In these embodiments, there may be a sensor dedicated to each column, or a set of current sensors could be sequentially switched between different groups of columns such that a portion, but not all of the column currents are sensed concurrently. This last embodiment would be slower than an embodiment with a sensor for every row, but faster than one at a time sensing.

Figure 14:
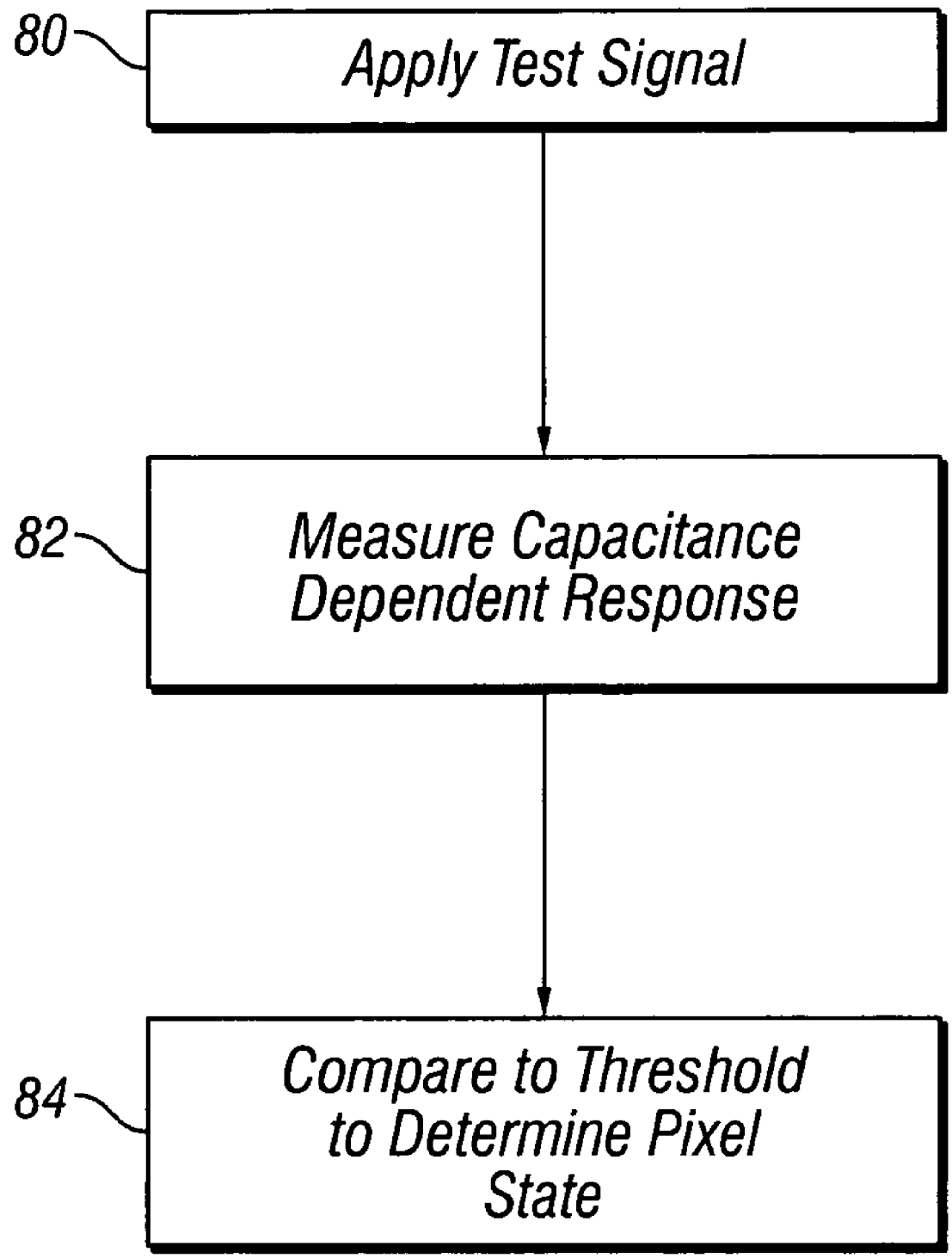
FIG. 14 is a flow chart of a state sensing process.

In accordance with the principles above, FIG. 14 is a flowchart illustrating an exemplary process for determining an open or closed state of an interferometric modulator. A test pulse is applied to the pixel at step 80. At step 82, a capacitance dependent response to the pulse is measured. At step 84, the response is compared to a threshold to determine the state of the pixel.

Pixel state sensing can be advantageous for a variety of reasons. For example, on the next frame update or refresh, only those pixels that are different from the next desired frame need be updated. For a static display, the pixel states may be monitored to detect which pixels have relaxed from an actuated state to a released state due to charge leakage. Selective updating could be performed in a variety of ways. For example, once one or more pixels change from the desired state, the driver circuitry could be turned back on, the tri-state buffers closed, and row strobing could be limited to only those rows which include pixels in an undesired state. Other rows could be skipped. This reduces the total energy required to update the display. Pixel state sensing could also be advantageous during the frame writing process, because as rows of pixels are written, they could be checked to determine if they were written correctly or not. If not, the row could be written again until correct.

Figure 15:
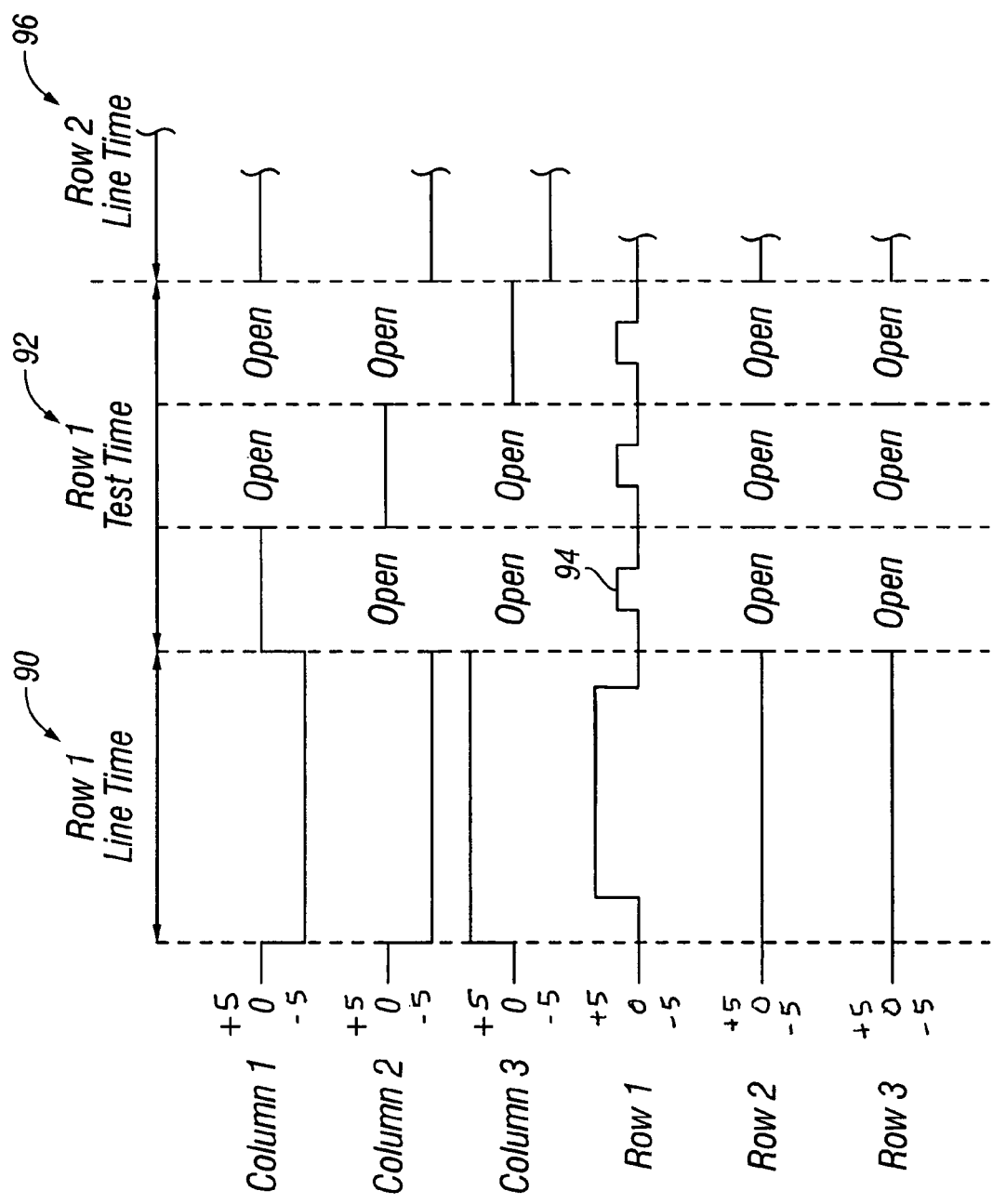
FIG. 15 is a timing diagram illustrating row and column voltages for setting and testing a row of interferometric modulators.
Figure 16:
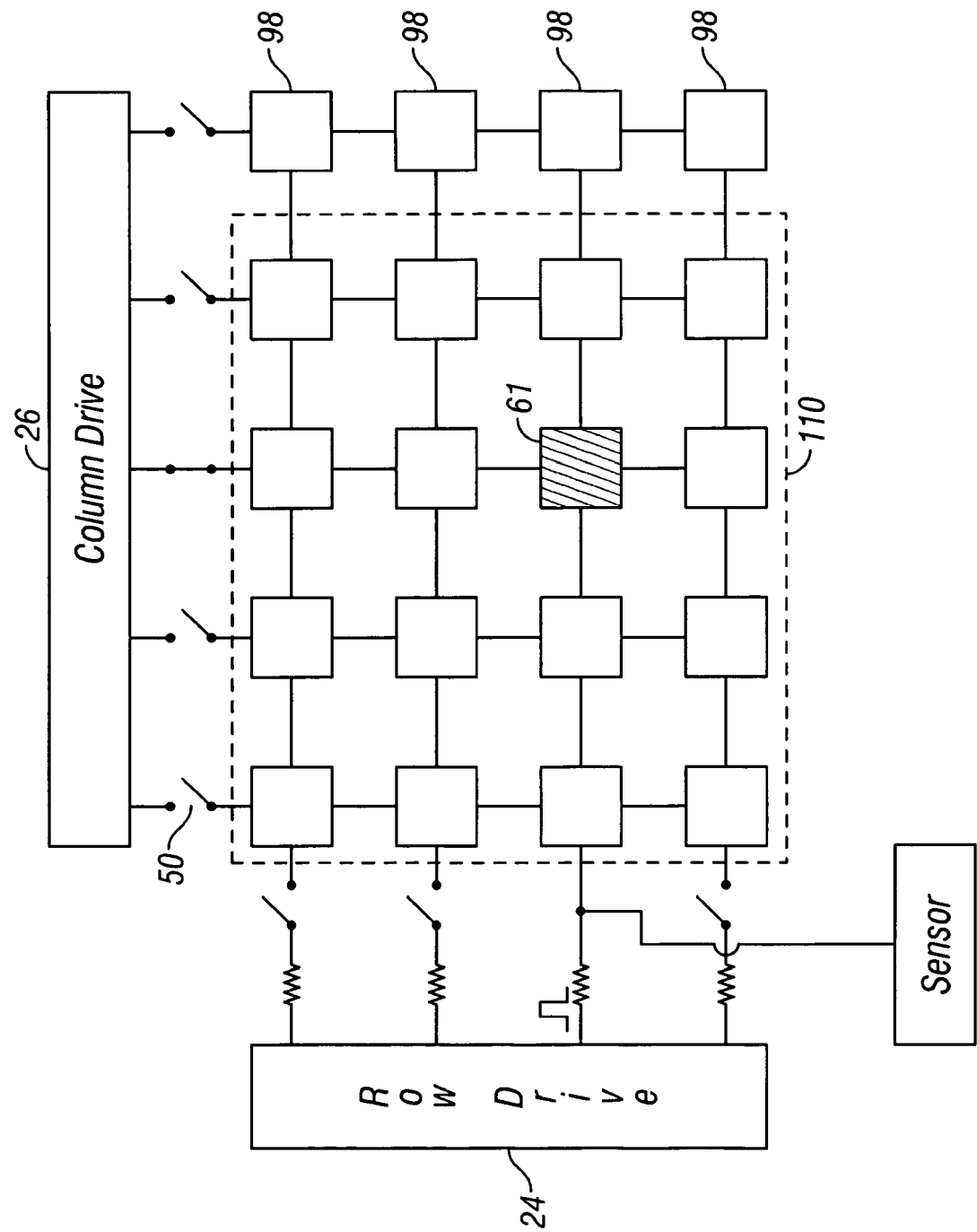
FIG. 16 is a block diagram of a state sensing apparatus for modulators embedded in arrays.

An implementation of this last process is illustrated in FIG. 15. After writing row 1 during the row 1 line time 90, a row 1 test time 92 is entered. In the first portion of this time period, only row 1 and column 1 are connected to the drive circuitry, and a test pulse 94 of about 1 volt or less is applied to row 1. As described above, the capacitance dependent response of pixel (1,1) is monitored to be sure it is in the actuated state as shown in FIG. 5A. This is repeated for pixels (1,2) and (1,3) during subsequent portions of the row 1 test time. The system then enters the row 2 line time, or alternatively, repeats the row 1 line time if it is determined that one or more pixels in row 1 have not been correctly written. For purposes of illustration, the test time period is shown much longer than would normally be necessary, as the pulse time periods for testing can be very short compared to the pulse periods used to actuate the pixels during the write process. When the pixel 61 being tested is part of a large array of tightly packed pixels, the testing process may be somewhat more complex. This is because the test pulse is applied to an entire row of pixels. Thus, the time constant of the charging process is dependent on the capacitance between the entire row electrode and the return column electrode, and this can be affected by the relative states of all the pixels in the row, not just on the state of the pixel being tested 61, shown again in FIG. 16. The dominant factor in the capacitance will be the state of the pixel being tested, but since there may be hundreds of pixels in the row, the combined effect of the remainder can be significant. There can also be capacitive coupling between pixels in different rows that share the same column electrode. The practical effect of this is that it may be advantageous to vary the pulse time period τ/3, the $V_{thresh}$ value, or both, when testing pixels in a given row, depending on the states of the other pixels in the row.

This determination can be done in several ways. One embodiment can include in each row, at the end of the row outside the viewed area of the display, a test pixel 98. This pixel can be switched between states, and the rise times for the test pulse can be determined for both the actuated and released states. In this way, the time period having the maximum voltage difference between states, and the voltage values between which $V_{thresh}$ should be located between could be determined based on the test pixel response. These values could then be used to test the state of the other pixels in the row.

Alternatively, a filter resistor could be placed at the end of the row instead of a test pixel. A collective capacitance measurement for the whole row electrode could then be made. The drive control circuitry could use this information to compute or look up an appropriate value for τ/3, $V_{thresh}$, or both, to test the pixels in that row.

Figure 17:
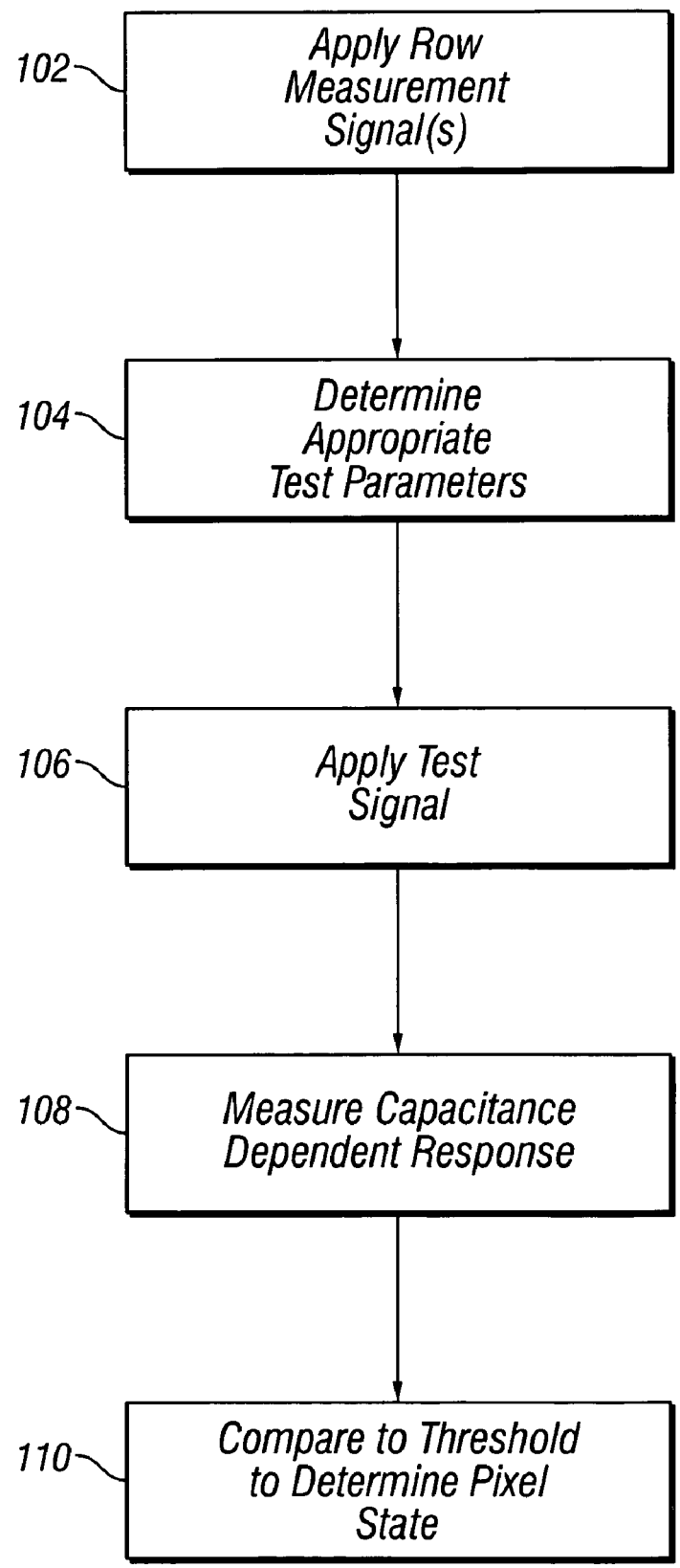
FIG. 17 is a flow chart of another embodiment of a state sensing process.

A general state sensing process using these principles for pixels embedded in arrays of rows and columns is illustrated in FIG. 17. At step 102, row measurement signals are applied to a row containing a pixel to be sensed. These signals could involve testing a test pixel or an overall row capacitance measurement as described above. At step 104, appropriate test parameters such as period τ/3 and/or $V_{thresh}$ are determined for later pixel testing in the row. As in FIG. 14, a test pulse is then applied to the row at step 106. At step 108, a capacitance dependent response to the pulse is measured. At step 110, the response is compared to a threshold to determine the state of a selected pixel in the row.

Pulse amplitudes and durations for the pixel state sensing process may be selected based on a variety of desired factors. The pulse may be shaped to control the total charge injected into the row. For isolated pixels, the pulse current and time profile can be defined such that a pre-selected charge is injected into the pixel regardless of its capacitance value. In this case, the resulting voltage across the pixel will be inversely proportional to the pixel capacitance. It may be possible to use this method for pixels in an array as well, but its usefulness may be limited since the charge injected into the row may be distributed throughout the hundreds of row pixels in a way that is complicated and difficult to predict. Pulse durations may be selected based on the circuit τ value, with short pulses preferred for time savings. It is of course desirable that the potential applied to the pixel during this process remains at all times within the hysteresis window so that the state sensing process does not itself change the state of the pixel being sensed. Thus, the driver will advantageously supply the appropriate bias voltage when not applying a charging pulse and when not decoupled by the tri-state amplifiers, and will generate pulses deviating from this bias voltage that are small enough (e.g. no more than 1 or 2 volts typically) such that the applied pixel voltages are never outside of the hysteresis window.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A display, comprising:
    at least one driving circuit;
    an array comprising a plurality of interferometric modulators, each of the interferometric modulators being connected to a column electric line and a row electrical line and being configured to be driven by the driving circuit; and
    a plurality of circuits connected between the driving circuit and the column electrical lines and the row electrical lines, wherein the circuits are configured to first electrically couple the array to the driving circuit and while the array is electrically coupled to the driving circuit, the driving circuit provides the array with a voltage that is greater than the midpoint of a hysteresis window of the interferometric modulators and that is below an actuation voltage of the interferometric modulators, and after the driving circuit provides the voltage, the circuits are configured to second electrically isolate the array from the driving circuit for an isolation period such that the driving circuit does not provide a voltage to the array during the isolation period, the array maintaining a voltage that is within the hysteresis window during the isolation period, wherein the isolation period is based on a predetermined time constant associated with the array and the plurality of circuits.

2. The display of claim 1, wherein the plurality of circuits each comprise a tri-state circuit.

3. The display of claim 1, wherein the driving circuit includes a row driving element and a column driving element.

4. The display of claim 1, wherein each of the plurality of circuits are connected to a select line from the driving circuit.

5. The display of claim 1, wherein the plurality of circuits electrically isolate the array from the driving circuit for at least 0.001 seconds.

6. The display of claim 1, wherein the plurality of circuits electrically isolate the array from the driving circuit for at least 0.5 seconds.

7. The display of claim 1, wherein the plurality of circuits electrically isolate the array from the driving circuit for at least 2 seconds.

8. The display of claim 1, wherein the driving circuit drives the voltage across each of the interferometric modulators to at least 95% of the actuation voltage of interferometric modulators prior to electrically isolating the array.

9. The display of claim 1, wherein the driving circuit drives the voltage across each of the interferometric modulators to at least 90% of the actuation voltage of interferometric modulators prior to electrically isolating the array.

10. The display of claim 1, wherein the driving circuit drives the voltage across each of the interferometric modulators to at least 75% of the actuation voltage of interferometric modulators prior to electrically isolating the array.

11. A method of controlling a display, the method comprising:
    electrically coupling the array of interferometric modulators to at least one driving circuit;
    applying a bias voltage to an array of interferometric modulators, wherein the bias voltage is greater than the midpoint of a hysteresis window of the interferometric modulators and the bias voltage is below an actuation voltage of the interferometric modulators, while the array of interferometric modulators is coupled to the at least one driving circuit; and
    electrically isolating the array of interferometric modulators from the at least one driving circuit subsequent to applying the bias voltage for an isolation period such that the driving circuit does not provide a voltage to the array during the isolation period, the array maintaining a voltage that is within the hysteresis window during the isolation period, wherein the isolation period is based on a predetermined time constant associated with the array.

12. The method of claim 11, additionally comprising turning-off a charge pump subsequent to electrically isolating the array.

13. The method of claim 11, wherein electrically isolating the array comprises activating a plurality of tri-state circuits.

14. The method of claim 11, wherein electrically isolating the array comprises driving a select line from the driving circuit.

15. The method of claim 11, wherein electrically isolating the array comprises electrically isolating the array from the driving circuit for at least 0.01 seconds.

16. The method of claim 11, wherein electrically isolating the array comprises electrically isolating the array from the driving circuit for at least 0.5 seconds.

17. The method of claim 11, wherein electrically isolating the array comprises electrically isolating the array from the driving circuit for at least 2 seconds.

18. The method of claim 11, wherein applying a bias voltage is performed prior to electrically isolating the interferometric modulators.

19. The method of claim 11, wherein the bias voltage is at least 95% of the actuation voltage of the interferometric modulators.

20. The method of claim 11, wherein the bias voltage is at least 90% of the actuation voltage of the interferometric modulators.

21. The method of claim 11, wherein the bias voltage is at least 75% of the actuation voltage of the interferometric modulators.

22. A system for controlling a display, the system comprising:
    means for electrically coupling the array of interferometric modulators to at least one driving circuit;
    means for applying a bias voltage to an array of interferometric modulators, wherein the bias voltage is greater than the midpoint of a hysteresis window of the interferometric modulators and the bias voltage is below an actuation voltage of the interferometric modulators, while the array of interferometric modulators is coupled to the at least one driving circuit; and
    means for electrically isolating the array of interferometric modulators from the at least one driving circuit subsequent to applying the bias voltage for an isolation period such that the driving circuit does not provide a voltage to the array during the isolation period, the array maintaining a voltage that is within the hysteresis window during the isolation period, wherein the isolation period is based on a predetermined time constant associated with the array and the electrically coupling means.

23. The system of claim 22, wherein the means for electrically isolating the array comprises means for driving a select line from the driving circuit.

24. The system of claim 22, additionally comprising means for applying a bias voltage to each of the interferometric modulators prior to electrically isolating the interferometric modulators.

25. A communications device, comprising:
- at least one driving circuit;
- an array comprising a plurality of interferometric modulators, each of the interferometric modulators being connected to a column electric line and a row electrical line and being configured to be driven by the driving circuit; and
- a plurality of circuits connected between the driving circuit and the column electrical lines and the row electrical lines, wherein the circuits are configured to first electrically couple the array to the driving circuit and while the array is electrically coupled to the driving circuit, the driving circuit provides the array with a voltage that is greater than the midpoint of a hysteresis window of the interferometric modulators and that is below an actuation voltage of the interferometric modulators, and after the driving circuit provides the voltage, the circuits are configured to second electrically isolate the array from the driving circuit for an isolation period such that the driving circuit does not provide a voltage to the array during the isolation period, the array maintaining a voltage that is within the hysteresis window during the isolation period, wherein the isolation period is based on a predetermined time constant associated with the array and the plurality of circuits.

26. A display, comprising:
- at least one driving circuit;
- an array comprising a plurality of bi-stable elements, each of the bi-stable elements being connected to a column electric line and a row electrical line and being configured to be driven by the driving circuit; and
- a plurality of circuits connected between the driving circuit and each of columns of electrical lines and the row of electrical lines, wherein the circuits are configured to first electrically couple the array to the driving circuit and while the array is electrically coupled to the driving circuit, the driving circuit provides the array with a voltage that is higher than a half of an actuation voltage of the bi-stable elements and that is below the actuation voltage of the bi-stable elements, and after the driving circuit provides the voltage, the circuits are configured to second electrically isolate the array from the driving circuit for an isolation period such that the driving circuit does not provide a voltage to the array during the isolation period, the array maintaining a voltage that is within the hysteresis window during the isolation period, wherein the isolation period is based on a predetermined time constant associated with the array and the plurality of circuits.

27. The display of claim 26, wherein the plurality of circuits each comprise a tri-state circuit.

28. The display of claim 26, wherein the driving circuit includes a row driving element and a column driving element.

29. The display of claim 26, wherein each of the plurality of circuits are connected to a select line from the driving circuit.

30. The display of claim 26, wherein the plurality of circuits electrically isolate the array from the driving circuit for at least 0.01 seconds.

31. The display of claim 26, wherein the plurality of circuits electrically isolate the array from the driving circuit for at least 0.5 seconds.

32. The display of claim 26, wherein the plurality of circuits electrically isolate the array from the driving circuit for at least 2 seconds.

33. The display of claim 26, wherein the driving circuit drives the voltage across each of the bi-stable elements to at least 95% of the actuation voltage of bi-stable elements prior to electrically isolating the array.

34. The display of claim 26, wherein the driving circuit drives the voltage across each of the bi-stable elements to at least 90% of the actuation voltage of the bi-stable elements prior to electrically isolating the array.

35. The display of claim 26, wherein the driving circuit drives the voltage across each of the bi-stable elements to at least 75% of the actuation voltage of bi-stable elements prior to electrically isolating the array.

36. The display of claim 1, wherein the plurality of circuits each comprise a tri-state buffer having at least a high impedance state.

37. The display of claim 36, wherein the tri-state buffer has an impedance of about 1 gigaohm in the high impedance state.

38. The display of claim 1, wherein the electrically isolating the array comprises electrically isolating the array from other circuitry.

39. The method of claim 12, wherein the electrically isolating the array comprises electrically isolating the array from other circuitry.

40. The display of claim 1, wherein the circuits are further configured to electrically isolate the array from the driving circuit based on the time constant associated with the interferometric modulators.

41. The method of claim 11, wherein electrically isolating the array of interferometric modulators is based on the time constant associated with the interferometric modulators.

42. The system of claim 22, wherein the electrically isolating means is configured to isolate the array of interferometric modulators based on the time constant associated with the interferometric modulators.

43. The communications device of claim 25, wherein the circuits are further configured to electrically isolate the array from the driving circuit based on the time constant associated with the interferometric modulators.

44. The display of claim 26, wherein the circuits are further configured to electrically isolate the array from the driving circuit based on the time constant associated with the bi-stable elements.

* * * * *